(12) United States Patent
Jensen-Horne et al.

(10) Patent No.: US 9,781,049 B2
(45) Date of Patent: Oct. 3, 2017

(54) RESOLVING INFORMATION IN A DATABASE ENVIRONMENT

(75) Inventors: Nathan Jensen-Horne, Walnut Creek, CA (US); Dileep Burki, San Jose, CA (US); Walter Sims Harley, Seattle, WA (US); Matthew Small, San Francisco, CA (US); Kenneth Douglas Scott, Alameda, CA (US); David Andrew Brooks, San Jose, CA (US); Prasad Peddada, Alameda, CA (US); Hemang Patel, Pleasanton, CA (US); Gaurav Chawla, Foster City, CA (US); Theresa Vietvu, Sunnyvale, CA (US); Shriman Gurram, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 1164 days.

(21) Appl. No.: 13/094,561

(22) Filed: Apr. 26, 2011

(65) Prior Publication Data

US 2011/0276890 A1    Nov. 10, 2011

Related U.S. Application Data

(60) Provisional application No. 61/332,662, filed on May 7, 2010, provisional application No. 61/332,901, filed
(Continued)

(51) Int. Cl.
*G06F 3/048* (2013.01)
*H04L 12/911* (2013.01)
(Continued)

(52) U.S. Cl.
CPC ............ *H04L 47/70* (2013.01); *G06F 9/5061* (2013.01); *H04L 41/5054* (2013.01); *H04L 47/783* (2013.01); *H04L 67/10* (2013.01)

(58) Field of Classification Search
CPC ............ G06F 9/5061; G06F 17/30873; G06F 3/04842; G06F 3/0484; G06F 3/0481;
(Continued)

(56) References Cited

U.S. PATENT DOCUMENTS 5,577,188 A    11/1996  Zhu
5,608,872 A     3/1997  Schwartz et al.
(Continued)

OTHER PUBLICATIONS

U.S. Notice of Allowance dated Dec. 20, 2012 issued in U.S. Appl. No. 13/094,545.
(Continued)

*Primary Examiner* — Jaime Duckworth
(74) *Attorney, Agent, or Firm* — Weaver Austin Villeneuve & Sampson LLP

(57) ABSTRACT

Disclosed herein are techniques for identifying computing resources specified by a representation of a computing service. In some implementations, a request to analyze a computing service provided via a computing environment may be received. The computing service may have an activated state in which the computing service is available for use and a deactivated state in which the computing service is not available for use. The computing environment may comprise a plurality of computing resources each defining a variable unit of computing functionality within the computing environment. Each computing resource may be associated with a respective parameter corresponding with a respective parameter value that specifies a level of the variable unit of computing functionality defined by the computing resource. The computing service may be represented by a metadata model comprising a plurality of nodes, at least some of which specify a respective one or more of the parameter values.

18 Claims, 14 Drawing Sheets

Related U.S. Application Data on May 10, 2010, provisional application No. 61/332,924, filed on May 10, 2010.

(51) Int. Cl.
  *H04L 12/24* (2006.01)
  *H04L 29/08* (2006.01)
  *G06F 9/50* (2006.01)

(58) Field of Classification Search
  CPC .............. G06F 3/0482; G06F 3/04817; H04L 29/0809; H04L 67/02; H04L 67/10; H04L 41/22; H04L 12/24; H04L 41/145; H04L 47/781; H04L 47/70; H04L 41/5054; H04L 47/783; G06Q 30/02
  USPC ........................................................ 715/738
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,053 B1 | 7/2001 | French et al. |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,589,719 B2 * | 9/2009 | Owens et al. ................ 345/419 |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,180,810 B2 | 5/2012 | Chiticarlu et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,291,405 B2 | 10/2012 | Buckley et al. |
| 8,443,085 B2 | 5/2013 | Jensen-Horne et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,775,946 B2 | 7/2014 | Jensen-Horne et al. |
| 8,904,011 B2 | 12/2014 | Jensen-Horne et al. |
| 9,037,722 B2 | 5/2015 | Jensen-Horne et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |

(56) References Cited

U.S. PATENT DOCUMENTS

| | | |
|---|---|---|
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0056026 A1 | 3/2003 | Anuff et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0177245 A1* | 9/2004 | Murphy ............... G06F 9/44505 713/100 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0021758 A1* | 1/2005 | White ..................... H04L 67/16 709/226 |
| 2005/0050555 A1 | 3/2005 | Exley et al. |
| 2005/0091098 A1 | 4/2005 | Brodersen et al. |
| 2006/0009284 A1 | 1/2006 | Schwartz et al. |
| 2006/0041421 A1 | 2/2006 | Ta et al. |
| 2006/0143572 A1 | 6/2006 | Scott et al. |
| 2008/0008456 A1 | 1/2008 | Buttars et al. |
| 2008/0033871 A1 | 2/2008 | Birbara et al. |
| 2008/0147530 A1 | 6/2008 | Kwan et al. |
| 2008/0249972 A1 | 10/2008 | Dillon |
| 2009/0019137 A1 | 1/2009 | Mishra et al. |
| 2009/0063415 A1 | 3/2009 | Chatfield et al. |
| 2009/0100342 A1 | 4/2009 | Jakobson |
| 2009/0144076 A1 | 6/2009 | Berstis |
| 2009/0177744 A1 | 7/2009 | Marlow et al. |
| 2009/0276459 A1 | 11/2009 | Trout et al. |
| 2009/0276771 A1 | 11/2009 | Nickolov et al. |
| 2010/0049728 A1 | 2/2010 | Chiticarlu et al. |
| 2010/0050179 A1* | 2/2010 | Mohindra et al. ............ 718/104 |
| 2010/0058177 A1 | 3/2010 | Engel et al. |
| 2010/0070610 A1 | 3/2010 | Buttars |
| 2010/0169893 A1 | 7/2010 | Collins et al. |
| 2010/0223619 A1* | 9/2010 | Jaquet ................... G06F 9/5016 718/104 |
| 2010/0250565 A1* | 9/2010 | Tobin et al. ................... 707/756 |
| 2011/0197197 A1* | 8/2011 | Ni et al. ......................... 718/104 |
| 2011/0213687 A1* | 9/2011 | Ferris et al. ..................... 705/34 |
| 2011/0213713 A1 | 9/2011 | Ferris et al. |
| 2011/0213875 A1 | 9/2011 | Ferris et al. |
| 2011/0213884 A1 | 9/2011 | Ferris et al. |
| 2011/0218958 A1 | 9/2011 | Warshavsky et al. |
| 2011/0230267 A1 | 9/2011 | Van Luchene |
| 2011/0231849 A1 | 9/2011 | Saha et al. |
| 2011/0247051 A1 | 10/2011 | Bulumulla et al. |
| 2011/0276674 A1 | 11/2011 | Jensen-Horne et al. |
| 2011/0276693 A1 | 11/2011 | Jensen-Horne et al. |
| 2011/0276892 A1 | 11/2011 | Jensen-Horne et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0326402 A1 | 12/2013 | Riggs et al. |
| 2014/0047117 A1 | 2/2014 | Jensen-Horne et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

U.S. Notice of Allowance dated Mar. 20, 2013 issued in U.S. Appl. No. 13/094,545.

U.S. Office Action dated Jan. 30, 2014 issued in U.S. Appl. No. 13/094,553.

U.S. Office Action dated Jul. 24, 2013 issued in U.S. Appl. No. 13/094,568.

U.S. Final Office Action dated Dec. 27, 2013 issued in U.S. Appl. No. 13/094,568.

U.S. Office Action dated Apr. 2, 2014 issued in U.S. Appl. No. 13/094,568.

"Google Plus Users", Google+Ripples, Oct. 31, 2011 [retrieved on Feb. 21, 2012 from Internet at http://www.googleplusers.com/google-ripples.html], 3 pages.

U.S. Notice of Allowance dated Jul. 8, 2014 issued in U.S. Appl. No. 13/762,045.

U.S. Notice of Allowance dated Sep. 10, 2014 issued in U.S. Appl. No. 13/762,045.

U.S. Notice of Allowance dated May 20, 2014 issued in U.S. Appl. No. 13/094,553.

U.S. Final Office Action dated Oct. 10, 2014 issued in U.S. Appl. No. 13/094,568.

U.S. Notice of Allowance dated Dec. 26, 2014 issued in U.S. Appl. No. 13/094,568.

U.S. Notice of Allowance dated Mar. 19, 2015 issued in U.S. Appl. No. 13/094,568.

* cited by examiner

RESOLVING INFORMATION IN A DATABASE ENVIRONMENT

PRIORITY AND RELATED APPLICATION DATA

This application claims priority to U.S. Provisional Patent Application No. 61/332,662, entitled "Methods and Systems for Resolving Information in a Multitenant Database Environment," filed on May 7, 2010 by Jensen-Horne, et al.; U.S. Provisional Patent Application No. 61/332,901, entitled "Method and System for Supporting Conflicting Sets of Enabled Application Features in a Multitenant Environment," filed on May 10, 2010 by Jensen-Horne, et al.; and U.S. Provisional Patent Application No. 61/332,924, entitled "Method and System for the Creation of Compatible Application Features in a Multitenant Environment, filed on May 10, 2010 by Jensen-Horne, et al., each of which is incorporated herein by reference in its entirety and for all purposes.

TECHNICAL FIELD

The present disclosure relates generally to on-demand services provided over a data network such as the Internet, and more specifically to resolving information in an on-demand service environment.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process steps for the disclosed inventive systems and methods for providing services to remote clients. These drawings in no way limit any changes in form and detail that may be made to embodiments by one skilled in the art without departing from the spirit and scope of the disclosure.

DETAILED DESCRIPTION

Figure 1:
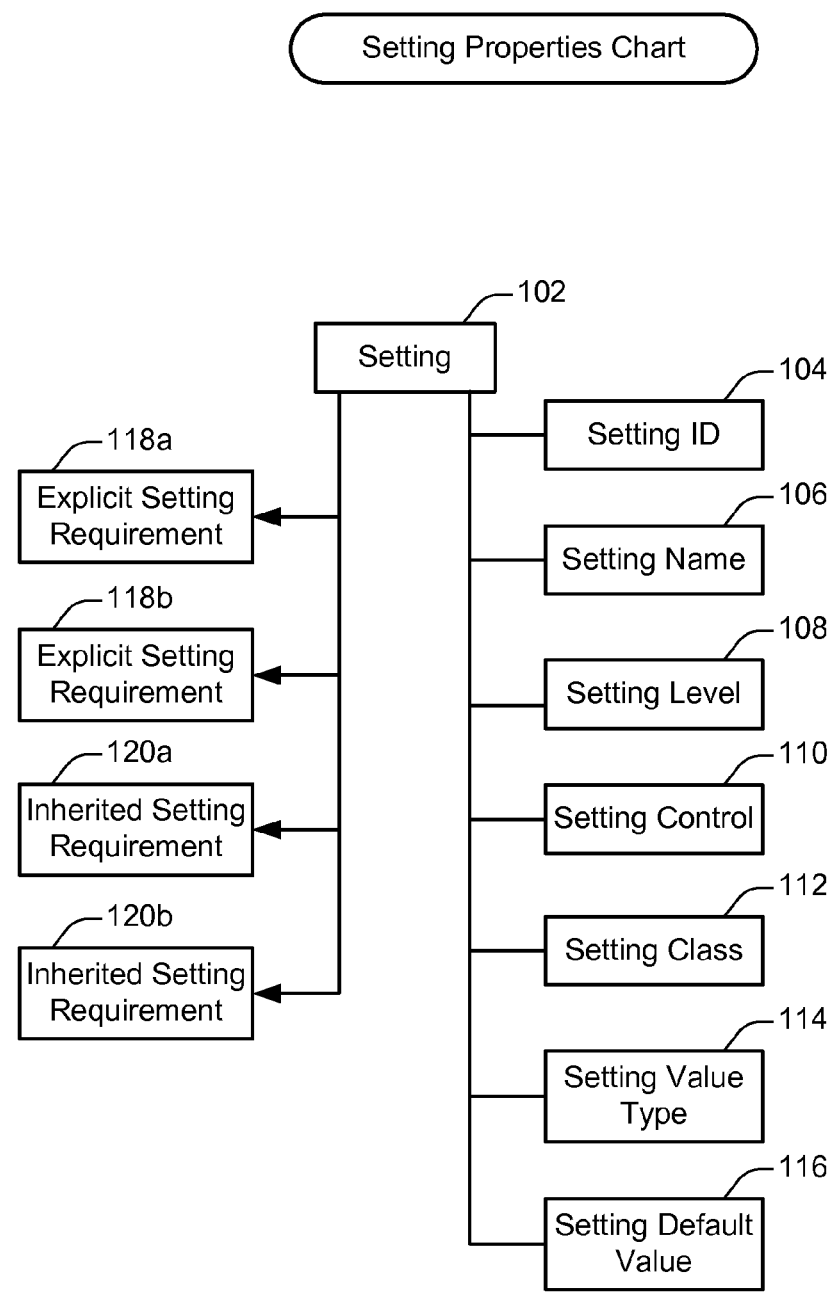
FIG. 1 shows a chart 100 illustrating properties of a setting, in accordance with one embodiment.

Applications of systems and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

In some implementations, customers in an on-demand service environment reside in a multitenant environment. Customers' data, metadata, and/or settings may be contained within a virtual portion of the on-demand service environment called an "organization" (also referred to herein as an "org.").

In some implementations, an org may be created out of a template. The template may specify, for example, an "edition definition" that defines a set of capabilities that should be enabled in the org. These capabilities may be represented in software as settings. Settings may include "org perms" and "org values." In some instances, org perms may include Boolean (i.e. on/off) values controlling the on/off state of a feature for the org. In some instances, org values may specify the numeric quantities of a feature, such as the number of custom database objects available within the org.

In some implementations, a settings model may be provided for the on-demand service environment. A setting may define a value that is controlled by the service provider, an entity accessing computing services provided by the service provider, or a user associated with the entity. For example, the service provider may control a setting that defines a value that specifies whether an entity has access to a particular standard database object, such as Account. At the same time, the entity may control a setting that defines a value that specifies whether the standard database object is actually enabled for the entity if the entity has permission to access the standard database object. A user associated with the entity may then have access to a setting that governs how the standard database object is displayed if the entity has access to the object and if the object is enabled for the entity. In some implementations, a computing environment may include hundreds or thousands of settings controlled at the system, entity, or user level.

In some implementations, the settings model may allow perms and/or values to be grouped into features. An on-demand service environment may include many settings. Grouping perms and/or values into features may impose a structure on the settings, which may improve organization of the settings, may facilitate easier maintenance of the on-demand service environment, and/or may provide other advantages.

In some implementations, the settings model may facilitate the flexible creation of features and feature sets. Features and feature sets may be used to impose an ordering such as a hierarchical structure on a relatively flat model of perms and values. Features and feature sets may also allow easier organization, definition, and/or modification of services provided via the on-demand service environment. With flexible features sets, individual features may be enabled or disabled for individual orgs. Thus, customers may not be limited to a relatively fixed set of pre-defined editions. Instead, customers may be provided with more choices regarding the activation or provision of computing resources available in the on-demand service environment.

In some implementations, the settings model may include a hierarchical arrangement of computing resources. At the highest level, resources may be arranged into packages, which are top-level, course-granularity units of functionality. Packages may include components and/or features, which are finer-granularity units of functionality. Packages, features, and components may be configurable. That is, packages, features, and components may expose settings that can be used to configure some aspect of the configurable item.

In some implementations, the settings model may be used to define a hierarchical arrangement of service offerings. A service offering may include a right to use certain services provided via the on-demand service environment. The types of service offerings may include licenses and products. A license provides a right to use one or more features available in the on-demand service environment. A product is a higher-level offering that includes at least one license.

FIG. 1 shows a chart 100 illustrating properties of a setting 102, in accordance with one embodiment. In some implementations, the setting 102 may correspond to a unit of computing functionality available within the computing environment. For example, the setting 102 may correspond to a Boolean value defining whether an entity has access to a particular database object. As another example, the setting 102 may correspond to an integer value specifying a number of custom database objects available to the entity. As yet another example, the setting 102 may correspond to a value defining an amount of bandwidth allocated to websites associated with the entity. The computing environment may include tens, hundreds, thousands, or any number of settings such as the setting 102.

The chart 100 shows properties of a setting 102 in a computing services environment. The setting 102 has a setting identifier (ID) 104, a setting name 106, a setting level 108, a setting control 110, a setting type 112, a setting value 114, and a setting default value 116. The setting 102 also has explicit setting requirements 118a and 118b, as well as inherited setting requirements 120a and 120b.

In some implementations, the setting ID 104 may specify an identifier value for the setting 102. In some instances, the setting ID 104 may be a database key facilitating the identification and/or location of the setting 102. The setting ID 104 may include information such as an identity of an entity to which the setting 102 corresponds. The setting ID 104 may uniquely identify the setting 102 such that no other setting shares the same identifier.

In some implementations, the setting name 106 may specify a name for the setting 102. In some instances, the setting name 106 may be used in conjunction with other properties to define a unique identity that may function as an alternative to the setting ID 104. For example, the setting name 106 may be unique in the context of a package, feature, or component in which the setting is contained.

In some implementations, the setting level 108 may specify the operational level at which the setting 102 may be modified. In some instances, a setting may be user-level or platform level. Runtime operations within the on-demand service environment may execute in the context of a particular user within an organization. The value of a user-level setting may vary by user or group of users. For example, some users within an entity may have permission to access a particular unit of computing functionality, while other users may not have this permission. In contrast to a user-level setting, the value of a platform-level setting may be the same for an entire entity. For example, the entity may have access to ten custom database objects.

In some implementations, a platform-level setting may vary based on a package or set of packages. For example, a setting may have a particular value for an entity, but the particular value may be overridden when accessing computing functionality within a designated package or group of packages.

In some implementations, the setting control 110 may specify a permission regarding who may change the setting. For example, the setting 102 may be system-controlled. A system-controlled setting cannot be modified except via the provisioning system. That is, permission to change a system-controlled setting may be limited to the service provider. As another example, the setting 102 may be entity-controlled. An entity-controlled setting may be modified by an entity other than the service provider accessing the computing environment.

In one example, a single feature may include more than one setting. A first setting for the feature may specify whether the feature is available for activation by an entity. A second setting for the feature may specify whether the feature is actually activated for the entity. In this example, the first setting may be system controlled. For instance, the entity may need to pay the service provider for access to the feature. The second setting may be entity-controlled. Even if the feature is available for the entity, the entity may choose whether or not to activate the feature. In this example, the feature may also include other settings, such as whether the feature is activated for a particular user.

In some implementations, the setting class 112 may associate a setting with a set of behaviors or internal implementation details specific to that setting class. For example, the setting for the limit on the number of custom objects for an organization may be of an "orgValue" setting class, while the setting for the ability to create leads may be of an "entityPerm" setting class. The setting class may influence other setting attributes such as the setting level or the setting value type.

In some implementations, the setting value type 114 may specify a data type for the setting value. The setting type may be, for example, Boolean, text, numeric, date, character or any other data type available for settings in the on-demand service environment.

In some implementations, the setting value type 114 may be dictated at least in part by the setting class. For example, for settings of an "orgPerm" setting class, the setting value type may be Boolean. As another example, for settings of an "orgValue" setting class, the setting value type may be numeric.

In some implementations, the setting default value 116 may specify the default value of the setting 102. The setting 102 may be assigned the setting default value 116 for a particular entity or user when no other value has been explicitly assigned to the setting 102. The setting default value 116 may be restricted by the setting type 114. Thus, if the setting type 114 is a Boolean, then the setting default value 116 may be limited to true/false (or 1/0).

In some implementations, a setting may specify and/or inherit one or more setting requirements. A setting requirement may act as a restriction or limitation on the value of the setting. For example, the setting 102 specifies two explicit setting requirements 118*a* and 118*b* and inherits two setting requirements 120*a* and 120*b*. However, other settings may specify or inherit any number of setting requirements.

In some implementations, the setting requirements may need to be satisfied for the setting 102 to be enabled. Enabling the setting 102 may involve changing the value 114 of the setting 102 to true if the setting 102 is a Boolean setting. If the setting 102 is not a Boolean setting, then enabling the setting 102 may involve changing the setting value 114 to a value other than null or some other default value.

In some implementations, a setting requirement may be specified in the form of a Boolean expression. The Boolean expression may evaluate to either true or false. The Boolean expression should evaluate to true for the setting to be enabled. That is, if the Boolean expression in any one of the requirements associated with the setting evaluates to false, then an attempt to enable the setting may fail.

In some implementations, the Boolean expression may include one or more variables. The variables of the Boolean expression may refer to other settings, system variables, or other expressions. For instance, the Boolean expression in a requirement for a first setting may indicate that a second setting must be assigned a minimum designated threshold value for the requirement to evaluate as "true."

In some implementations, the variables of the Boolean expression may refer to configurable items other than settings. For instance, a variable in the Boolean expression may refer to a particular feature. The variable may evaluate to "true" if a setting specifying whether the particular feature is enabled is itself set to "true."

In some implementations, setting requirements may be explicitly specified for a setting. For example, the setting 102 includes two explicit setting requirements 118*a* and 118*b*. Explicit setting requirements may be specified by a developer when the setting 102 is a created or may be added later to reflect changes to the settings model.

In some implementations, settings may inherit setting requirements. For example, the setting 102 includes two inherited setting requirements 120*a* and 120*b*. As discussed herein, the settings model may facilitate the development of a hierarchical organization of computing resources that may contain items such as packages, components, features, and settings. If a setting is included in one or more higher-level items, then the setting may inherit requirements specified by the higher-level items. The hierarchical nature of the settings model is discussed in greater detail with references to FIGS. 2 and 3.

In some implementations, lower-level items in the settings model may implicitly inherit requirements specified at higher levels. For example, the requirements for a given feature may implicitly include the requirements of its containing package. As another example, the requirements for a component may implicitly include the requirements of its containing feature. As yet another example, the requirements for a setting may implicitly include the requirements of its containing component. Accordingly, the inherited setting requirements 120*a* and 120*b* may be specified explicitly in a higher level resource such as a feature or component.

In some implementations, the settings model may specify rules for inheritance of requirements. These rules may be specific to a component type or may vary based on some other aspect of the settings model. For example, the requirements for a field may implicitly include the requirements of the parent entity. As another example, the requirements for a foreign key field may implicitly include the requirements of the foreign key domain entity.

In some implementations, the settings that may be referenced within a setting requirement may be limited by a property of the setting 102. For example, a platform-level setting may have a setting requirement that refers to other platform-level settings but may not have a setting requirement that refers to user-level settings. A setting with a setting level 108 of user-level may have a setting requirement that refers to either (or both) platform-level or user level settings.

In some implementations, the settings model may allow a setting to have various numbers and/or types of settings requirements. For example, the setting 102 includes two explicit setting requirements 118a and 118b and two inherited setting requirements 120a and 120b. However, some settings may have no requirements, while other settings may have many requirements.

Figure 2:
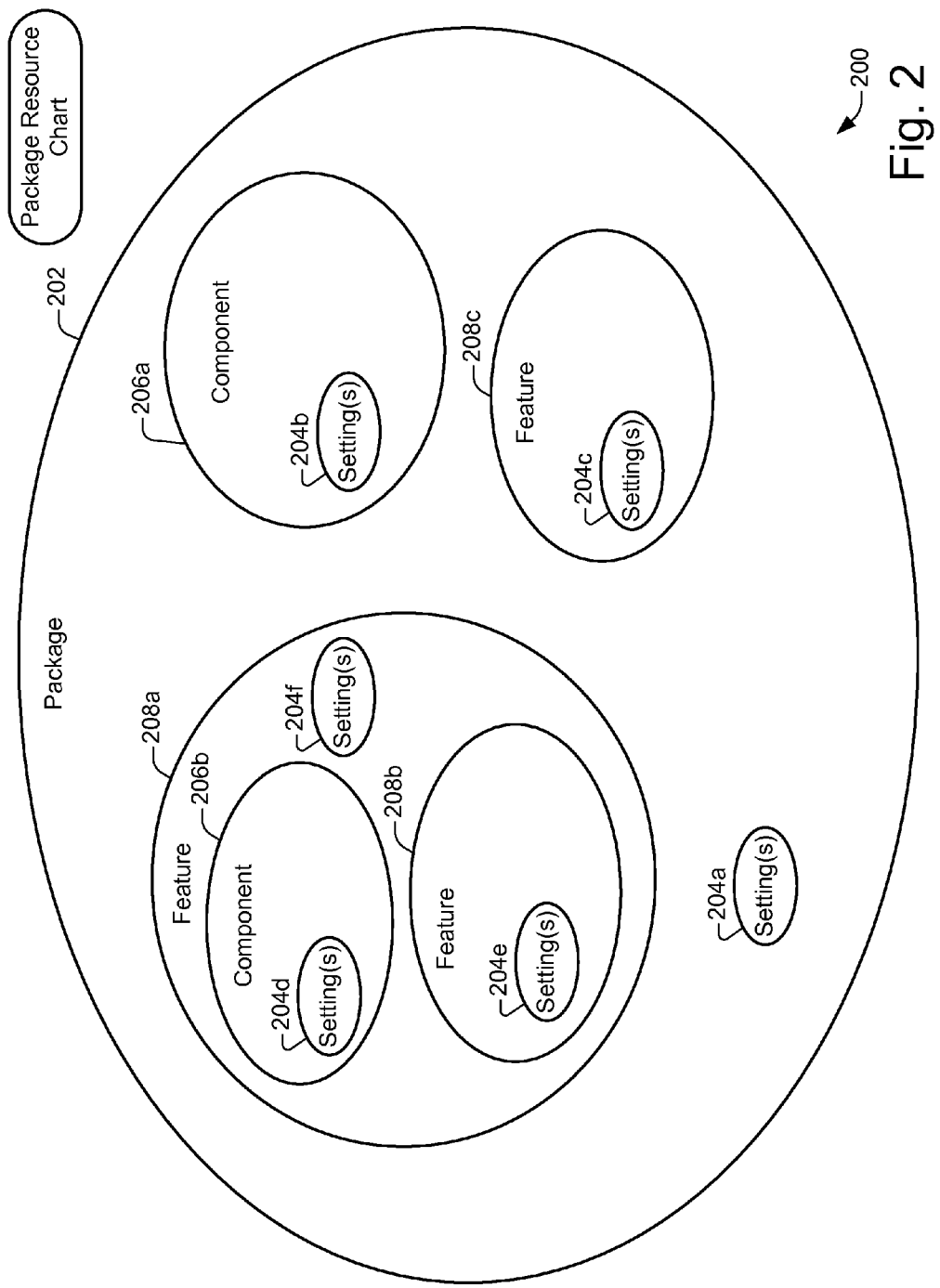
FIG. 2 shows a chart 200 illustrating the organization of computing resources within a settings model, in accordance with one embodiment.

FIG. 2 shows a chart 200 illustrating the organization of computing resources within a settings model, in accordance with one embodiment. The representations of computing resources shown in FIG. 2 are organized within a package 202. The package 202 includes the settings 204a-204f. The package 202 also includes the components 206a and 206b. The package 202 also includes the features 208a-208c.

In some implementations, packages, components, features, and settings are each configurable resources within the on-demand service environment. Configurable resources act as units of computing functionality within the computing environment. For instance, if a particular setting, feature, component, or package is activated for a particular entity, then the entity has access to the computing functionality specified by the setting, feature, component, or package.

In some implementations, packages, components, features, and settings are representations of computing resources arranged in a hierarchical relationship. In the hierarchy of computing resources, higher level resources may contain lower level resources. A setting may be the lowest level of computing resource within the hierarchy, while packages, components, and features represent higher levels within the hierarchy.

In some implementations, if a parent feature, component, or package is activated for a particular entity, then the entity has also access to the computing functionality specified by any child settings, features, components, or packages contained within the parent feature, component, or package.

In some implementations, levels in the hierarchy of computing resources may correspond to relative granularity of computing functionality. Computing resources that are lower in the hierarchy may represent relatively finer-grained computing functionality. For example, enabling a setting may provide access to a relatively limited unit of computing functionality defined by the setting, while enabling a package may provide access to all of the computing functionality defined by the various features, components, and settings included within the package.

In some implementations, each computing resource within the hierarchy may have only one immediate parent resource. For example, a setting that is included within a parent component may not be included within any other component, feature, or package that does itself contain the parent component.

In some implementations, arranging configurable computing resources within a hierarchical settings model may facilitate testing of computing resource configurations. A computing environment may include hundreds, thousands, or any number of settings. Since each setting may have at least two values, the number of permutations of settings values for a particular entity may be extremely large. This set of permutations represents a theoretical universe of potentially-valid settings states that may need to be tested. However, arranging computing resources within a hierarchical settings model may eliminate as invalid many of the permutations of settings that would otherwise be possible. For instance, if a particular setting is contained within a particular feature, then activating the feature while not activating the setting may be an invalid permutation of settings values that need not be tested. Permutations of settings that are eliminated as invalid may not need to be tested, thus simplifying the testing of the computing resource configurations that are possible within the computing environment.

In some implementations, configurable resources may be contained within a package. A package may define a configurable unit of computing functionality according to the configurable resources included in the package. Packages are high-level, coarse-granularity units of functionality. For example, the package 202 shown in FIG. 2 includes a variety of settings, features, and components. If the package 202 is enabled for a particular entity, then the settings, features, and components included within the package are enabled.

One example of a package may be account management. Account management may provide basic functionality related to accessing and managing database objects related to accounts. For example, the account management package may include access to standard database objects such as Account and Contact. The account management package may also include access to various test cases, Java® classes, scripts, and other resources. These resources may be represented as settings, features, and components within the account management package.

In some implementations, one example of a feature is territory management. Activation of the territory management feature may allow users to transfer accounts between different geographical territories. Territory management may include a system-level setting defining whether or not territory management is available for use by an entity. Territory management may include a platform-level setting defining whether or not territory management is actually activated for the entity, if it is available. Territory management may also a user-level setting defining whether or not territory management is activated for a particular user, since this feature may be relatively privileged.

In some implementations, a package may contain features. A feature may include other features. For example, the parent feature 208a includes the child feature 208b. When a parent feature includes a child feature, the parent feature includes any settings, features, and components contained within the child feature. Thus, the parent feature 208a includes the settings 204e contained within the child feature 208b. A parent feature may also directly include settings. For example, the parent feature 208a directly includes the settings 204f.

In some implementations, a feature may include components. For example, the parent feature 208a includes the child component 206b. When a parent feature includes a child component, the parent feature includes any settings and components contained within the child component. Thus, the parent feature 208a includes the settings 204d contained within the child component 206b.

In some implementations, settings may be grouped into components or features. For example, the component 208a includes the settings 204b and 206b, and the component 208b includes the settings 204d and 206d. As another example, the feature 210c includes the settings 204c, and the feature 210b includes the settings 204e. By grouping settings into components or features, a group of settings may be treated as a unified computing resource.

In some implementations, the roles of components and features within the settings model may have both similarities and differences. For example, both components and features may be configurable by virtue of including settings. However, a feature may describe a grouping or containment of other abstract containers (e.g., of settings, of components, or of child features), while a component may describe one or more computing resources. Also, a given scope (e.g., a tenant computing space or a group of packages within a tenant computing space) may be limited to a single logical instance of a feature, while such a scope may include more than one instance of a particular component type. Different instances of a particular component type may include the same settings, such as user-level settings for data objects specifying whether a user can read, create, modify, and/or delete rows.

In some implementations, restrictions may be imposed on which types of resources may contain which other types of resources. For example, a feature may contain other features as well as components, as shown with respect to feature 208a. However, a component may not be allowed to contain features. Alternately, a different set of restrictions or no restrictions at all may be imposed.

In some implementations, the settings model may be hierarchical in the sense that each component and setting may be contained in only one feature. That is, features may contain features, components, and settings, but features may not be permitted to overlap with one another. Alternately, some overlap between features may be permitted.

In some implementations, each package, feature, and component may include at least one setting. For example, each package, feature, component may be required to at least include a setting specifying whether the feature or component is enabled. In FIG. 2, the package 202 directly contains settings 204. Each feature and component included in the package 202 also contains a respective one or more settings. Settings are discussed in additional detail with respect to FIG. 1.

In some implementations, packages, features, and components may each include implicit and/or explicit requirements. These requirements may function in a manner similar to the requirements 118a, 118b, 120a, and 120b discussed with respect to the setting 102 shown in FIG. 1.

In some implementations, certain portions of a feature may include requirements in addition to the requirements of the feature itself. For example, the account object within the account management feature may include a database field corresponding to territory. In this case, access to the territory field may require activation of the territory management feature. Thus, it may be possible to activate a feature such as account management without activating each and every portion of that feature.

In some implementations, a unit of computing functionality represented within the hierarchical settings model may be provided by accessing source items within the computing environment. For example, a particular setting may represent access to a corresponding standard database object, such as Account. If the setting is enabled for an entity, then the entity may create and access Account objects. This interaction may include access to web pages configured to display Account objects, scripts configured to create or process information related to Account objects, and other Account object management tools.

In some implementations, the settings model may be extensible. Developers may extend the system by adding components, packages, or features to those provided within the on-demand service environment. Alternately, or additionally, developers may add settings to existing features, components, and/or packages.

In some implementations, the settings model may be made extensible at least in part by defining an abstract class, template, or interface for components or for types of components. For example, one type of component may be an entity, which may include components such as Account or Contact. Other types of components may include, but are not limited to: business or data objects (e.g., accounts, contacts), UI pages (e.g., a page displaying account overview information), functional groupings of UI pages (e.g., accounts, contacts, leads, opportunities, which together may comprise a UI for automation), executable units of business logic (e.g., an Apex class for converting a quote to an opportunity), integration endpoints (e.g., a web service for GIS data), and business processes (e.g., a process for submitting, reviewing, and approving travel expenses). By defining an abstract class, template, or interface, a new component may include by default certain settings or requirements and may be more easily positioned within the existing settings model.

In some implementations, organizing settings into coarser-granularity units of functionality may facilitate the creation of service offerings for users of the on-demand service environment. By grouping computing resources, the resources can be managed, activated, deactivated, and provided as a unit rather than requiring individual attention. The on-demand service environment may be segmented into functional units with well-defined external dependencies. Techniques for service offering creation are discussed in more detail with reference to FIG. 4.

In some implementations, representing computing resources within a hierarchy may facilitate dependency analysis. Dependency analysis may be used to identify dependency relationships within the settings model associated with the on-demand service environment. In a dependency relationship, one computing resource requires access to another computing resource in order to function properly. By grouping computing resources, dependency analysis can be conducted for groupings of computing resources as well as for individual computing resources. Techniques for dependency analysis are discussed in more detail with reference to FIGS. 5-7.

In some implementations, the collection of settings contained within a particular package, feature, and/or component may be obtained by iterating over the configurable resources within the package and requesting the settings for each. A settings discovery procedure to obtain the collection of settings for an offering is discussed in more detail with respect to FIG. 8.

Figure 3:
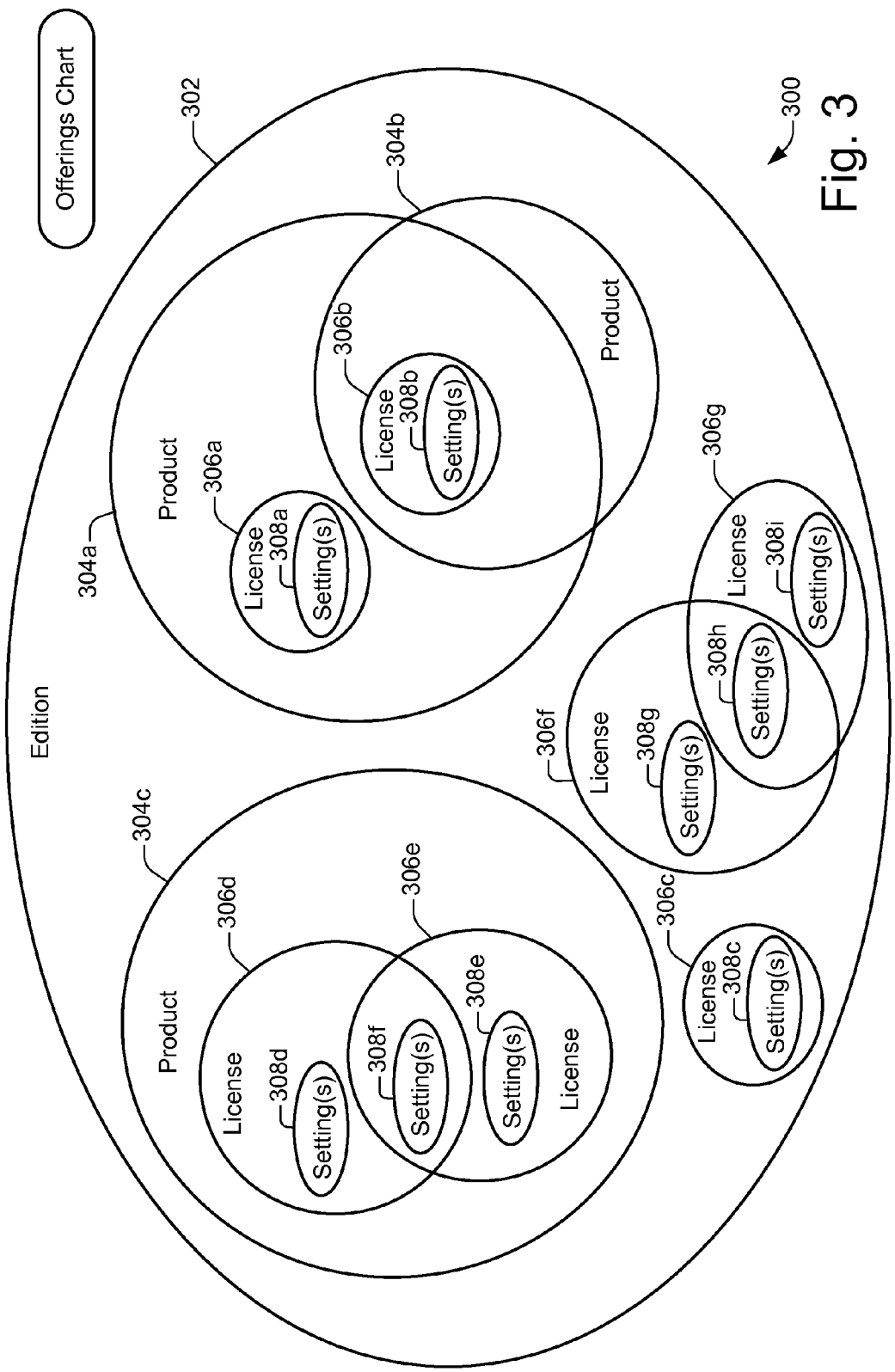
FIG. 3 shows a chart 300 illustrating an arrangement of computing resources into service offerings, in accordance with one embodiment.

FIG. 3 shows a chart 300 illustrating an arrangement of computing resources into service offerings, in accordance with one embodiment. The service offerings shown in FIG. 3 include an edition 302, product definitions 304a-302c, license definitions 306a-306g, and settings 308a-308i.

In some implementations, a service offering definition includes a description of computing resources that are activated for an entity when an instance of the service offering definition is provided to the entity. An instance of the service offering may grant access to the functionality enabled in the service offering definition to the customer entity, and confers the specified setting values to the entity org. For example, if a service offering definition includes a particular setting value for a setting, then the setting may be assigned the setting value for an entity if an instance of the service offering definition is provided to the entity.

In some implementations, a service offering definition may include a logical grouping of computing resources such as settings, features, components, and/or packages, as discussed with respect to FIG. 2. However, as discussed with respect to FIG. 2, relatively higher level computing resources such as features, components, and packages may each include at least one setting indicating whether the computing resource is enabled. Thus, service offering definitions may be specified primarily or entirely in terms of settings.

In some implementations, an organizational chart of service offerings, such as that shown in FIG. 3, may act as an overlay on an organizational chart of computing resources, such as that shown in FIG. 2. Similarly, the organizational chart of computing resources may itself be an overlay on a representation of the settings that are available within the computing environment. Thus, the system may prevent an attempt to create a service offering that includes a conflicting set of features as shown in FIG. 2. For example, a service offering that includes a setting value that enables a particular feature but that disables a setting included within that feature may be disallowed.

In some embodiments, service offering definitions may be hierarchical in the sense that some service offerings may contain other service offerings. However, service offering definitions may not be strictly hierarchical in the sense that a single service offering may be included within several parent service offerings. The hierarchical relationships between service offerings are discussed in additional detail with respect to the types of service offerings that may be defined.

In some implementations, service offering definitions may be created at least in part to correspond to market demands. For example, different types of entities may be expected to desire different combinations of computing resources that are capable of being provided via the computing environment. As another example, entities may wish to receive access to certain units of computing functionality while not desiring to receive access to other units of computing functionality. A method for creating a service offering is discussed in additional detail with respect to FIG. 4.

In some implementations, service offerings may be created at least in part to impose an ordering on the services provided to an entity. Rather than activating a set of disconnected settings for a particular entity, the service provider may provide a smaller set of licenses that include the desired computing functionality. This allows the computing functionality to be viewed at a higher, less granular level than at the individual settings level. By abstracting the computing functionality in this way, less technical users may be made more capable of producing offerings according to market demands.

In some implementations, service offering definitions may be created at least in part in order to quickly and easily identify the set of computing resources activated for an entity. In some cases, an entity may wish to activate different sets of overlapping computing functionality. If this computing functionality is provided via instantiations of service offerings, then the service offering definitions corresponding to the activated computing functionality may be automatically aggregated to determine the actual computing functionality to which the entity is entitled. If instead the computing functionality were provided by manually setting individual settings values for the entity's org, then determining the values that the settings should be assigned may be a difficult task.

In some implementations, service offering definitions may be created at least in part to allow computing functionality to be temporarily activated for an entity. For example, an entity may wish to try out a unit of computing functionality to which the entity currently does not have access. In this case, the entity may be provided with a temporary license to use the computing functionality. When the license expires, the computing functionality may be automatically enabled for the entity. Such automatic feature set provisioning may be easier than manually changing settings values for the entity and then reverting the settings to a previous state.

In some implementations, providing computing functionality defined by a service offering definition to a particular entity may include creating an instance of the service offering for the entity. Creating an instance of the service offering may also be referred to herein as instantiating the service offering. Instantiating the service offering may include operations for assigning values to settings as specified by the service offering definition within the entity's org.

In some implementations, instantiating the service offering may include operations for identifying the settings values included within the service offering. A method for discovering the settings and/or requirements for a service offering is discussed with respect to FIG. 8.

In some implementations, the instantiation of service offering definition for an entity may imply the assignation of certain settings values for the entity. In some implementations, a service offering definition may have implicit or explicit requirements. Requirements for service offerings are similar to requirements for features, which are discussed with reference to FIG. 1. The requirements for service offerings may be computed by aggregating the requirements specified on the license definition itself, the requirements of the features to be enabled, the settings to be set. Further, any requirements that are satisfied within the service offering definition itself may be removed. In some instances, the computed set of requirements may be empty if all individual requirements are satisfied internally. A method for identifying settings and requirements for a service offering definition is discussed with respect to FIG. 8.

In some implementations, two or more service offerings provided to the same entity may specify a value for the same setting. The effective value for that setting may be determined by aggregating the setting values from each service offering as defined on the setting itself. The technique for aggregating the setting values may vary between settings. Possible aggregation techniques may include, for example, summing the setting values, determining the minimum setting value, or determining the maximum setting value. In some implementations, the default setting aggregation techniques may be determined by the setting data type. Not all aggregation techniques may be available for a given data type.

In one example, an entity may have a license for full use of customer relations management (CRM) features. This license may include access to 100 custom database objects. The entity may also have a license for access to an additional 50 custom database objects. Thus, the entity may have access to a total of 150 custom database objects.

In some implementations, an instantiation of a service offering may impose limits on the use of the licensed features. For example, a service offering may include a time limit. After the time limit expires, the features provided by the service offering may be disabled. In this situation, the effective setting values may be determined by recalculating the aggregate without the values from the expired/disabled service offering. As another example, a service offering may specify a limit to the number of active users that may have access to the associated functionality at one time.

In some implementations, a license may function as a relatively low-level service offering. A license may include one or more settings. In some instances, these settings may correspond to the enablement of components, features, or packages as discussed with respect to FIG. 2.

FIG. 3 includes the license definitions 306a-306g. Each license definition may include at least one setting, as shown in FIG. 3. In some instances, license definitions may overlap. That is, two different license definitions may include the same setting. For example, license definition 306f includes setting(s) 308g, and license definition 306g includes setting(s) 308i, while both license definitions 306f and 306g include setting(s) 308h.

In some implementations, a license definition may be platform-level. A platform license definition may be configured to specify values for platform-level settings for an entity. A platform license definition may refer to platform-level settings in its requirements. A platform license may be unable to specify values for or specify requirements on user-level settings.

In some implementations, a license definition may be user-level. A user license definition may confer setting values to a set of users, or may confer to users with certain administrative privileges the ability to grant access to user-level functionality. A user-level license definition may be able to specify values for user-level settings, and may refer to platform-level or user-level settings in its requirements. However, a user license may not be able to specify values for platform-level settings.

In some implementations, a product definition may function as a mid-level service offering. The product definition may include within it one or more license definitions and, in so doing, implicitly include the settings contained within those license definitions. For example, the product 304c shown in FIG. 3 includes the licenses 306d and 306e, which include the settings 308d-308e.

In some implementations, product definitions may overlap. For example, two different product definitions may include the same license definitions. In FIG. 3, the products 304a and 304b both include license 306b, which includes settings 308b. However, only the product 304a includes the license 306a, which includes the settings 308a.

In some implementations, an edition definition may function as a high-level service offering. The edition definition may include one or more settings, products, and licenses. For example, the edition definition 302 includes all of the other offerings shown in FIG. 3.

In some implementations, an edition definition may be directed toward a particular service level, industry, or other logical grouping of entities. In one example, different editions may be created based on service level, such as editions corresponding to full access, professional access, or limited access to the computing resources provided via the computing environment. In a second example, different editions may be created with computing resources selected to suit entities doing business in different industries, such as the telecommunication industry or the energy industry. In a third example, different editions may be created with computing resources selected to suit entities of different sizes, such as small, medium, and large entities. In a fourth example, different editions may be created with computing resources selected to provide a certain type of computing functionality, such as a workflow edition or a customer relations management (CRM) edition.

Figure 4:
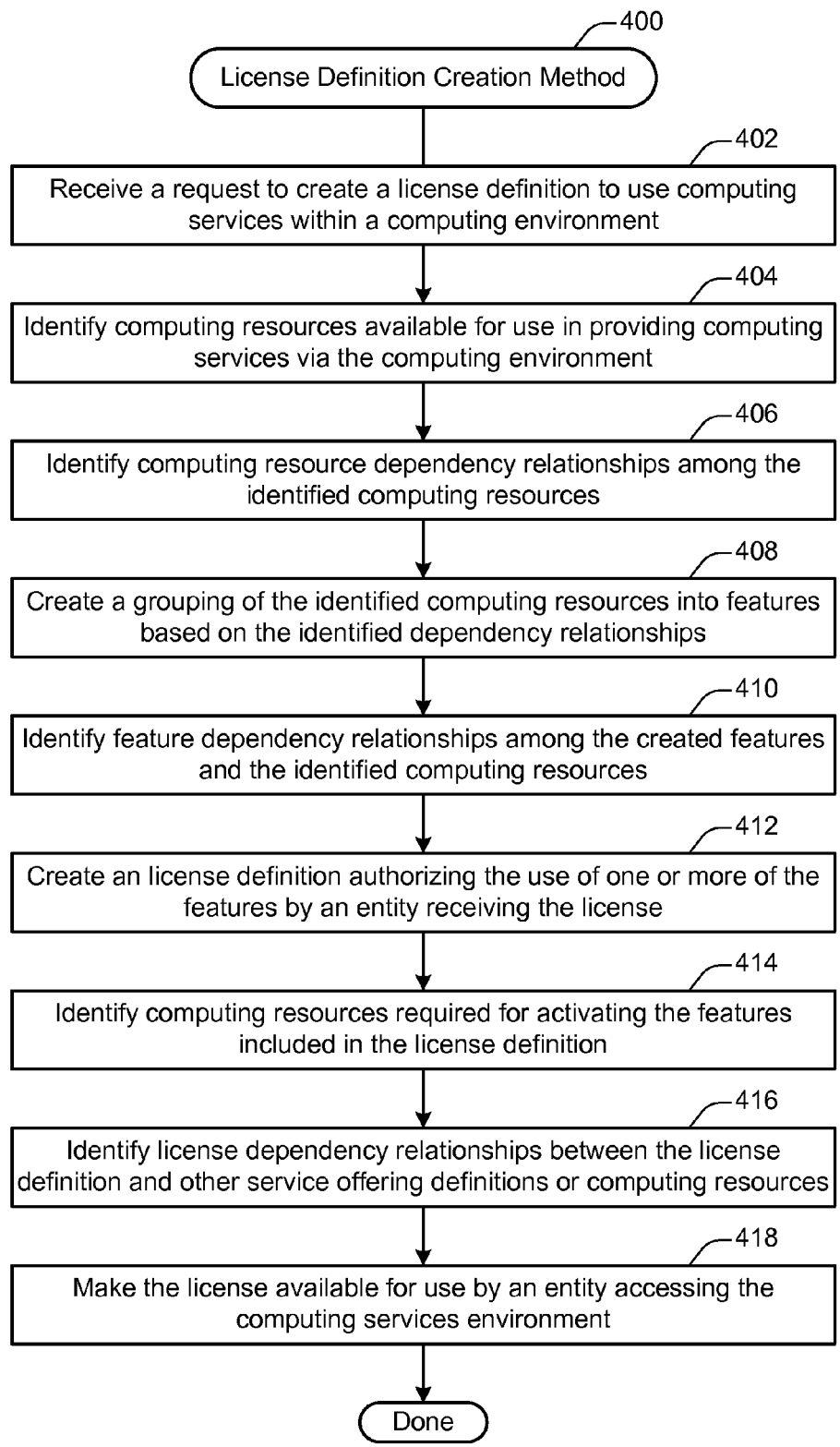
FIG. 4 shows a flow diagram of a method 400 for creating a license, performed in accordance with one embodiment.

FIG. 4 shows a flow diagram of a method 400 for creating a license, performed in accordance with one embodiment. In some implementations, a computing services environment may be used to provide computing services. The computing services may be provided by accessing units of computing functionality within the computing services environment. In some implementations, the license definition creation method may be used to create service offering definitions for various types of service offerings, including licenses, products, and packages.

In some implementations, a unit of computing functionality may be activated or deactivated for an entity accessing the computing services environment. In some instances, a unit of computing functionality may be associated with a parameter value defining a variable level of access to the computing functionality. For instance, an entity accessing the computing services environment may be provided with access to 0, 1,000, 1,000,000, or any other number of database rows for storing data. As another example, an entity accessing the computing services environment may or may not be provided with access to a customer relations management (CRM) application available via the computing services environment.

In some implementations, the computing functionality available to an entity accessing the computing services environment may be flexibly provisioned. For example, computing resources with a low level of granularity may be grouped into modules having a higher level of granularity. Examples of how computing resources may be grouped within a hierarchical settings model are discussed with respect to FIGS. 1-3.

In some implementations, dependency relationships among the computing resources may exist. For example, access to the CRM application may require access to at least 1,000 rows of database storage and to designated database objects used by the CRM application. These dependency relationships may be identified and analyzed to facilitate the grouping of computing resources into units of higher level of granularity.

In some implementations, a license may created. A license may include a right to access computing resources designated by the license definition. Facilitating the flexible creation of licenses may allow non-technical or less-technical individuals such as marketing staff to provision and sell feature sets for services provided by the computing services environment.

At 402, a request to create a license to use computing functionality within a computing services environment is received. In some implementations, the request may be received at a computing device within the computing services environment.

In some implementations, the request may be received from a user such as an administrator, a marketer, or a salesperson associated with the computing services environment. In some instances, the user may provide input for creating a customized offering license for services accessible via the computing environment. Alternately, the system may automatically create features and licenses in accordance with a request for certain computing functionality.

At 404, computing resources available for use in providing computing services via the computing services environment are identified. In some implementations, a directory or index of computing resources may be maintained. The directory may include, for example, a list of computing resources that may be activated or deactivated for an organization. Alternately, or additionally, the directory may include a list of computing resources as well as variable states that may be assigned to variables that control access to the computing resources.

At 406, computing resource dependency relationships among the identified computing resources are identified. In some implementations, the dependency relationships may be identified based on references to computing resources within source files. The dependency relationships may be identified on request or at periodic intervals. A method for identifying dependency relationships is discussed with respect to FIG. 6.

At 408, a grouping of the identified computing resources into features is created. In some implementations, the grouping may be based on the identified dependency relationships.

In some instances, the grouping may be based at least in part on an identification of a high degree of interdependency within a selected group of computing resources. For example, a selected group of computing resources may have dependency relationships that are primarily internal to the group. In this case, grouping the selected computing resources into a single feature may make sense since providing only one portion of the selected features while not providing a second portion of the selected features may violate the identified dependency relationships.

In some instances, the grouping may be based at least in part on an identification of the type of external dependency relationships shared by the selected group of computing resources. An external dependency relationship involves both a member of the selected group of computing resources and a member outside the selected group of computing resources. If many of the external dependency relationships are relationships in which resources external to the group depend on resources within the group, then the grouping may make sense because the selected computing resources may be freely activated without taking these external dependency relationships into account. If instead many of the external dependency relationships are relationships in which resources within the group are dependent on resources external to the group, then the grouping may not make sense because activating the selected resources may require also activating the resources specified by the dependency relationships. However, if these outward pointing dependency relationships are primarily dependent on resources already included in predefined, more basic licenses definitions, then the grouping may still be valid because it could be provided as an add-on to these more basic license definitions.

In some instances, the grouping may be based at least in part on an identification of a common or similar functionality associated with the selected computing resources. For example, a resource activating a particular standard database object, such as Account, may be grouped with resources that are functionally associated with the Account object, such as Account object test cases.

At 410, feature dependency relationships among the created features and the identified computing resources are identified. In some implementations, the feature dependency relationships for a feature may be identified by analyzing the dependency relationships of the computing resources included within the feature. If a first feature includes a computing resource that is dependent upon a computing resource external to the first feature, then the first feature is also dependent on the external computing resource. If access to the external computing resource implies access to a second feature, then the first feature is dependent upon the second feature.

At 412, a license definition is created. In some implementations, the license definition may authorize the use of one or more of the features by an entity for which the license is instantiated. Examples of license definitions and other offering definitions are discussed with respect to FIG. 3.

In some instances, a license definition may be created by grouping features according to similar functionality. For example, a collection of features related to customer relations management, such as account management, contacts, a browser-based software telephone, and customer service applications may be grouped into a basic CRM license definition.

In some instances, a license definition may be created by grouping features according to a similar service level. For example, a basic service level may include access to a low level of bandwidth for websites of the entity purchasing the license, access to a limited number of custom database objects, access to a limited set of on-demand applications, and other such features. As another example, a professional service level may include access to a high level of bandwidth, access to a large number of custom database objects, access to all available on-demand applications, and other high level features.

At 414, computing resources required for activating the features included in the license definition are identified. At 416, license dependency relationships between the license definition and other service offerings or computing resources are identified. In some implementations, identifying these settings values and requirements may be accomplished at least in part by iterating over the license definition to aggregate the settings values included within the license definition as well as explicit and implicit requirements created by the license definition. A method for identifying settings values and requirements is discussed with respect to FIG. 8.

At 418, a license corresponding to the license definition is made available for use by an entity accessing the computing services environment. In some implementations, the license definition may be published in a directory. Entities may access a description of the license to determine the features included in the license. If an instance of the license is provided to an entity, then the entity may use the computing functionality included in the license definition.

Figure 5:
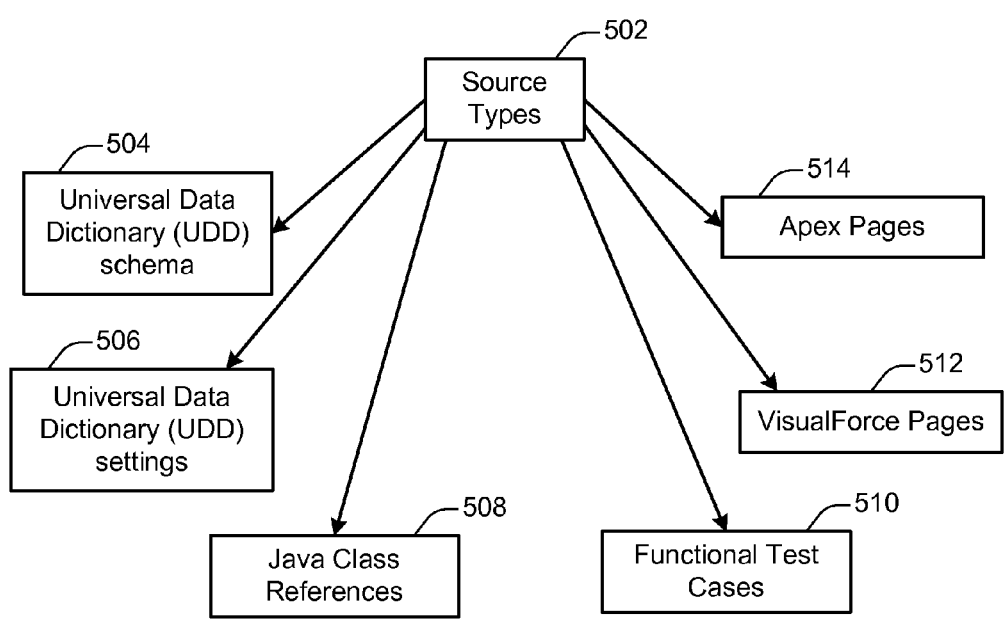
FIG. 5 shows a chart 500 illustrating source types for conducting dependency analysis, in accordance with one embodiment.

FIG. 5 shows a chart 500 illustrating source types 502, in accordance with one embodiment. In some implementations, a computing environment may include a variety of software resources for providing computing services. The software resources may include markup code for generating pages and user interface components. The software resources may also include computer programming instructions for performing processing operations related to generating pages and user interface components or for providing other types of computing services. The computing environment may also include descriptive resources that define or index the software resources.

The source types 502 include universal data dictionary (UDD) schema 504, UDD settings 506, Java® class references 508, functional test cases 510, VisualForce® pages 512, and Apex® pages 514. These source types are examples of the source types that may be used for dependency analysis and for other purposes. However, other source types not shown in FIG. 5 may also be used for analysis. Alternately, or additionally, not all source types shown in FIG. 5 may be analyzed.

In a first example, a source type may correspond to source code implemented in a particular programming language such as Apex®, VisualForce®, JSP®, Java®, Ruby®, or PLSQL®. In a second example, a source type may correspond to an archive of execution logs such as logs that identify areas of a system affected by end user actions. In a third example, a source type may correspond to historical source code change information, such as information indication that changes to one area of source code are typically accompanied by changes to another area of source code. In a fourth example, a source type may correspond to correlated automated test cases and code coverage data, which may identify automated test cases that are affected by user actions or changes to source code. In a fifth example, a source type may correspond to correlated source code control information and automated test regressions, which may identify information such as which test cases broke after which source code changes. In some implementations, processing source types corresponding to correlations involving test cases may be particularly useful for test cases that are categorized by functional area, as may be the case in quality assurance.

In some implementations, a source type may include one or more source items. For example, the VisualForce® pages source type may include one or more VisualForce® pages. Each source type may include references to other source items. For instance, a VisualForce® page may include references to UI components included within the page. These references may be used to identify dependency relationships in which access to one source item cannot be provided without also providing access to another source item.

Figure 7:
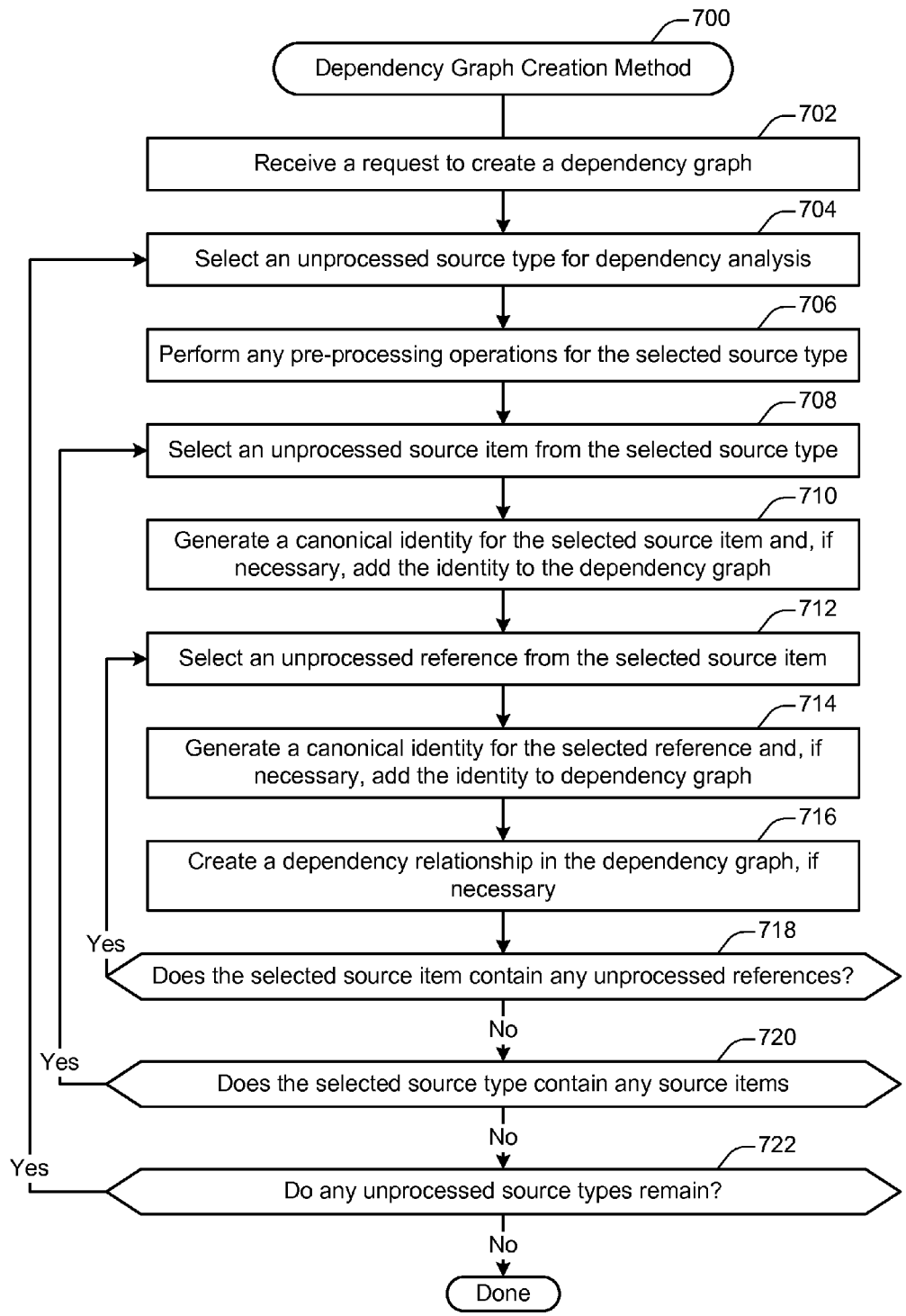
FIG. 7 shows a flow diagram of a method 700 for creating a dependency graph, performed in accordance with one embodiment.

In some implementations, some or all of the source types may be analyzed to identify dependency relationships. Each source type may be analyzed via a dependency analysis tool that is specific to the source type. The dependency analysis tool may take into account factors such as the types of references and/or source items included within a source type. For example, the UDD may be analyzed via an UDD parser configured to parse the information contained in the UDD. As another example, Java® classes may be analyzed via a Java®-specific tool such as one provided within the Eclipse® project for Java® development. A general method for analyzing dependency relationships and creating a dependency graph is shown in FIG. 7. However, at least some of the specific operations included within FIG. 7, such as selecting source items and identifying references, may vary depending on the source type being analyzed.

At 504, the Universal Data Dictionary (UDD) schema source type is shown. In some implementations, the UDD contains metadata information that describes units of computing functionality available within the computing environment. For example, the UDD contains information describing data objects, settings, and other units of computing functionality.

In some implementations, the UDD may facilitate metadata-driven development. In metadata-driven development, some portions of the computing environment may be common to different units of computing functionality. The UDD may then define differences between these units of computing functionality. The UDD may function as an abstraction layer providing a description of and means of accessing units of computing functionality accessible within the computing environment.

At 506, the UDD settings source type is shown. In some implementations, the UDD settings source type may contain a description of the various settings that are included within the settings model. The description of settings may include the types of information shown in FIG. 1. For example, each setting may be associated with an identifier, such as setting ID 104. Additionally, settings may include explicit or inherited setting requirements. These setting requirements may be used to identify dependency relationships that involve the setting.

At 508, the Java® class references source type is shown. In some implementations, references internal to Java® classes may be analyzed to identify dependencies. Alternately, dependency relationships for some types of sources may not be analyzed or may be analyzed independently of other sources. For instance, Java® classes may handle internal references to other Java® classes, and these references may not be processed when performing dependency analysis. However, other source items, such as VisualForce® pages, may include references to Java® classes. These references from other source items may be analyzed to identify external dependencies that implicate Java® classes.

At 510, the functional test case source type is shown. In some implementations, a source type may include source items that combine computer programming instructions with other software resources such as data or markup. For example, the functional test case type 510 may include functional test cases as source items. These functional test cases may include computer programming instructions for testing Apex® pages, VisualForce® pages, or other features of the computing environment. In addition, the functional test cases 510 may include test data for use in performing such tests. By testing a page or other service with test data, a determination can be made as to whether the page or other service performs as expected.

In some implementations, the functional test cases may include references to pages, database objects, Java®, or components within the computing environment. These references may be analyzed to identify dependency relationships.

At 512, the VisualForce® pages source type is shown. In some implementations, VisualForce® pages include web pages written in accordance with the VisualForce® programming language. The VisualForce® programming language, available from salesforce.com® of San Francisco, Calif., may allow end users of a computing environment to construct their own pages that interact with various aspects of the computing environment. The VisualForce® pages source type may include individual VisualForce® pages or groups of VisualForce® pages as source items. Different computing environments may include one or more different languages as an alternative to VisualForce® pages.

In some implementations, users of the computer environment may create customized pages using a markup language such as VisualForce®. This language may allow access to portions of the computing environment while restricting access to other portions of the computing environment.

In some implementations, VisualForce® pages may include references to other VisualForce® pages, to user interface components, to page controller programming language classes, or to other source items within the computing environment. These references may be analyzed to identify dependency relationships.

At 514, the Apex® pages source type is shown. The Apex® programming language, available from salesforce.com® of San Francisco, Calif., may allow developers within a computing environment to construct their pages that interact with various aspects of the computing environment. The Apex® pages source type may include individual Apex® pages or groups of Apex® pages as source items. Different computing environments may include one or more different languages as an alternative to Apex® pages.

In some implementations, Apex® pages may be used to display user interface components and other information. Apex® pages may include page markup and may refer to other Apex® pages, user interface components, page controllers, and other source items within the computing environment. These references may be analyzed to identify dependency relationships.

Figure 6:
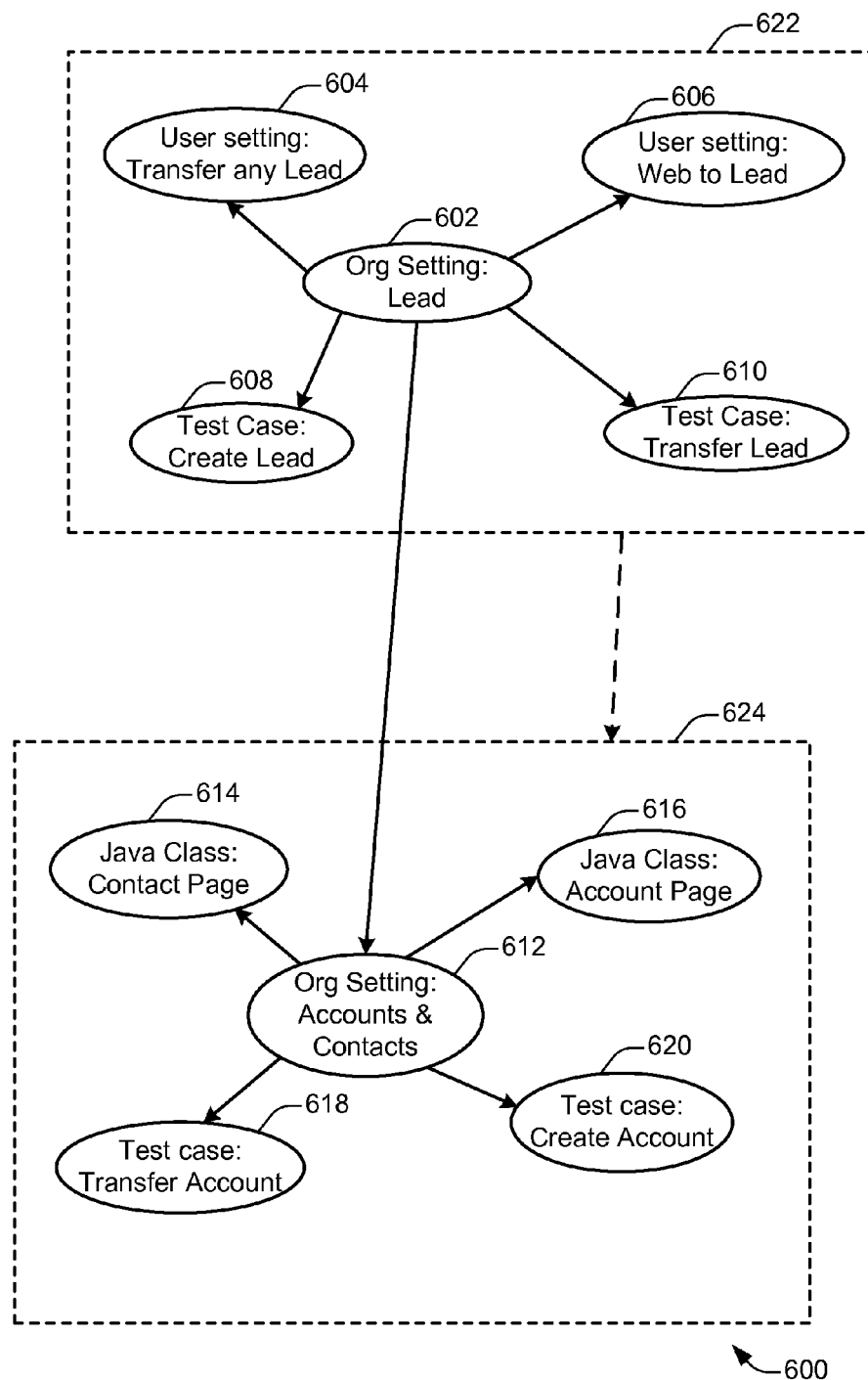
FIG. 6 shows an example of a dependency graph 600 that includes nodes and dependency relationships, in accordance with one embodiment.

FIG. 6 shows an example of a dependency graph 600, in accordance with one embodiment. In some implementations, a dependency graph similar to the graph 600 may be used to represent dependency relationships between various computing resources within a computing environment. The computing environment may be, for example, an on-demand computing services environment accessible by a plurality of entities.

In some implementations, the dependency graph 600 may be used to demonstrate dependency relationships between various types of computing resources, including settings, features, components, packages, licenses, products, and editions. Thus, the dependency graph 600 may be represented as an overlay of relationships on a graph that represents these computing resources. Examples of graphs representing such computing resources are shown in FIGS. 2 and 3.

In some implementations, the dependency graph 600 may be represented as a data structure stored within memory accessible to a computing device. For instance, the dependency graph 600 may be represented in a matrix or any other structure used to represent directed graphs. The dependency graph may be created via a customized graph data structure library, a pre-existing graph data structure library, or a combination of a customized and pre-existing graph data structure library.

In some implementations, a dependency graph may include a collection of nodes and relationships between the nodes. For example, the dependency graph includes nodes 602, 604, 606, 608, 610, 612, 614, 616, 618, and 620. Each node may represent a computing resource accessible within a computing environment.

In some implementations, various types of computing resources may be represented within the dependency graph. In FIG. 6, for example, the node 612 represents an Org Setting allowing use of database objects representing Accounts and Contacts, which may be used in customer relations management. The node 614 represents a Java Class used to create a Contact Page for representing a Contact object. The node 616 represents a Java Class used to create an Account Page for representing an Account object. The node 618 represents a test case, which may include test data or procedures, for testing a Transfer Account operation. The node 620 represents a test case for testing a Create Account operation. The node 602 represents an Org Setting allowing use of a Lead database object, which may be used to represent a prospective account that has not yet been finalized. The node 604 represents a User setting allowing use of a Transfer any Lead operation, which may allow a Lead to be transferred into an Account. The node 606 represents a User setting allowing use of a Web to Lead transfer operation, which may allow information from a network such as the Internet to be transferred into a Lead. The node 608 represents a test case for creating a lead object. The node 610 represents a test case for transferring a lead.

In some implementations, some or all of the computing resources may be assigned an activated or deactivated state. In an activated state, a computing resource may be available use by an entity within the computing environment. In a deactivated state, a computing resource may be unavailable for use.

In some implementations, arrows between nodes in a dependency graph represent dependency relationships between the computing resources represented by the nodes. For instance, the arrow pointing from the node 602 to the node 604 in FIG. 6 means that the computing resource represented by the node 602 (i.e. the Org Setting: Lead) may require access to or use of the computing resource represented by node 604 (i.e. the User Setting: Transfer any Lead) in order to function properly.

In some implementations, identifying such relationships may allow the imposition of restrictions on the states of the computing resources represented by the nodes within the dependency graph. For instance, in the preceding example regarding the nodes 602 and 604, the system may require that the node 604 be assigned an activated state in order for the node 602 to be assigned an activated state.

In some implementations, the dependency graph 600 may be created via the dependency graph creation procedure 700 shown in FIG. 7. For instance, the dependency graph 600 may be created by selecting various source items and identifying references within those source items to other computing resources. If a source item refers to a computing resource external to that source item, then the source item may depend on that computing resource for proper function. The creation of a dependency graph is discussed in greater detail with respect to FIG. 7.

In some implementations, a dependency graph may be used to group related computing resources into higher level computing resources. For example, as discussed with respect to FIG. 2, resources may be grouped into classifications such as features, components, and packages. In FIG. 6, for instance, the computing resources 602, 604, 606, 608, and 610 are grouped into classification 622, which may represent a feature or component. As another example, the computing resources 612, 614, 616, 618, and 620 are grouped into classification 624.

In some implementations, grouping resources into higher level classifications may be performed automatically. For instance, a computer program may analyze the dependency graph and determine that a particular group of nodes has a relatively high level of interrelation and a relatively low number of external dependencies. As another example, a computer program may identify a number of computing resources that are closely related to an Org Setting.

In some implementations, grouping resources into higher level classifications may be performed manually. For instance, the dependency graph may be presented to a user on a display screen, and the user may identify groupings of computing resources.

In some implementations, grouping resources into higher level classifications may allow assigning computing resources to an activated or deactivated state in groupings instead of, or in addition to, a resource-by-resource basis. In some instances, activating computing resources on a resource-by-resource basis may be somewhat cumbersome. For example, if a user such an administrator wished to activate the Org Setting Lead for a particular organization, then the user may first need to know that activated Org Setting Lead requires activation of the computing resources represented by the nodes 604-610 and then need to activate those computing resources in order to activate the Org Setting Lead. If instead the classification 622 may be activated as a whole, then the administrator may need to indicate to the system only that the classification 622 should be activated for the Org, and the computing resources represented by the nodes 602-610 may then be activated automatically.

In some implementations, grouping resources into higher level classifications may allow analyzing dependency relationships between these higher level classifications. In FIG. 6, for instance, the Org Setting Lead is dependent on the activation of the Org Setting Accounts & Contacts. If the classifications 622 and 624 are placed in an activated state as a whole rather than on a resource-by-resource level, then an inference may be drawn regarding the dependency between the two classifications. Specifically, since the Org Setting Lead is grouped within classification 622 and the Org Setting Accounts & Contacts is grouped within classification 624, an inference can be drawn that the classification 622 is dependent on the classification 624. This inferred dependency relationship is represented by a dotted line arrow in FIG. 6.

In some implementations, identifying dependency relationships between higher level classifications may be performed automatically. For example, when a classification is created, the analysis procedure may automatically determine the nodes on which the classification is dependent. Alternately, or additionally, the dependency relationships between higher level classifications may be identified manually. For example, a user creating a classification may specify other classifications or dependency graph nodes on which the classification depends.

In some implementations, higher level classifications may themselves be grouped into even higher level classifications. For example, as discussed with respect to FIG. 2, features may include both components and other features. As another example, as discussed with respect to FIG. 3, features may be grouped into licenses and products. The creation of licenses is discussed in additional detail with respect to FIG. 4.

FIG. 7 shows a flow diagram of a method 700 for creating a dependency graph, performed in accordance with one embodiment. For example, the method 700 may be used to create or update a dependency graph similar to the graph 600 shown in FIG. 6.

The method 700 may be initiated when a request to create a dependency graph is received at 702. In some implementations, the request may be received at a computing device configured to provide computing services within the computing environment.

In some implementations, the method 700 may interact with a dependency graph data structure such as the graph 600 shown in FIG. 6. These interactions may include adding nodes, removing nodes, adding dependency relationships, removing dependency relationships, or any other interactions. The techniques used to perform these interactions may be strategically determined based on the data structures used to represent and facilitate access to the dependency graph.

In some instances, the request may be received in the context of a different procedure or method. For instance, operation 404 shown in FIG. 4 may trigger the method 700 shown in FIG. 7. Alternately, an independent request to create a dependency graph may be received. For example, a dependency graph may be created and/or updated periodically.

In some implementations, the request received at 702 may be a request to update an existing dependency graph. For example, computing resources may have been added to or removed from the computing environment. As another example, a grouping of computing resources into higher level classifications may be changed. In such cases, an existing dependency graph may be altered to reflect the updated information.

At 704, an unprocessed source type is selected for dependency analysis. In some implementations, various source types may be used. The types of sources that may be analyzed to identify dependency relationships are discussed with respect to FIG. 5.

In some implementations, an unprocessed source type may be selected based on any one of various orderings. An order in which to analyze source types may be strategically determined based on factors such as the types of source items included within a source type and the types of dependency relationships that different source types reveal.

At 706, pre-processing operations may be performed for the selected source type. In some implementations, pre-processing operations may include operations for identifying source items of the selected source type. Additionally, or alternately, pre-processing operations may include operations for abstracting or identifying the references in each source items. In some instances, pre-processing operations may not be performed. For example, the UDD may be parsed without performing many or all pre-processing operations.

At 708, an unprocessed source item is selected from the selected source type. As discussed with respect to FIG. 5, each source type may include one or more source items. The types of source items selected at operation 708 may depend at least in part on the source type selected at 704. For instance, if the source type selected at 704 includes Apex pages, then the source item selected at 708 may be an individual Apex page. As another example, if the source type selected at 704 includes the UDD, then the source item selected at 708 may include a portion of the UDD, such as a particular classification of UDD settings.

At 710, a canonical identity for the selected source item is generated. In some implementations, source items may be referred to in various ways through the various source types and source items that may be analyzed. For instance, a class name may include a name space for the class when referred to within a source item outside of the name space and may not include the name space when referred to within a source item that is within the name space. The canonical identity created at operation 710 may be used to provide a common identifier for a source item.

In some implementations, generating a canonical identity may allow nodes to be entered into the dependency graph for computing resources that are first referred to within a source item, outside a formal definitional context such as the UDD. If a canonical identity may be generated based on a reference to a computing resource, then source types may be processed without imposing a dependency relationship. For example, there may be no need to process the UDD source types before processing other source types.

Once the canonical identity is created, it may be compared with the dependency graph to determine whether the selected source item is already represented within the graph. If the source item is already represented as a node within the graph, then the source item need not be added to the graph. If instead the source item is not represented as a node within the graph, then a node may be added. In some implementations, the node may reflect the canonical identity for the selected source item identified at 710.

At 712, an unprocessed reference is selected from the selected source item. Each source item may have one, none, many, or any number of references. For example, an Apex page may refer to a number of components provided within the page. As another example, the UDD schema 504 may define a number of different database objects. References may be selected from the selected source item sequentially or in any other order.

At 714, a canonical identity for the selected reference is generated. If necessary, the canonical identity is added to the dependency graph. In some implementations, operation 714 may be substantially similar to operation 710.

At 716, a dependency relationship is created in the dependency graph, if necessary. The presence of the selected reference within the selected source item indicates that the selected source item may need the selected reference in order to function. For example, a reference to a specific component within an Apex page may indicate that if the Apex page were rendered for an organization for which the specific component was not activated, then an error might result.

In some cases, the dependency relationship identified at 716 may already be represented within the dependency graph. For instance, a similar reference may have been previously encountered and processed elsewhere in the source item. Thus, the dependency graph may be checked to determine whether the identified dependency relationship is already reflected. If so, then nothing may need to be done. If not, then the graph may be updated to include the identified dependency relationship.

At 718, a determination is made as to whether the selected source item contains any unprocessed references. The types of references that may be included in a source type are discussed with respect to operation 712.

At 720, a determination is made as to whether the selected source type contains any unprocessed source items. The types of source items that may be included in a source type are discussed with respect to operation 708.

At 722, a determination is made as to whether any unprocessed source types remain. The source types available for processing are discussed with respect to operation 704.

Figure 8:
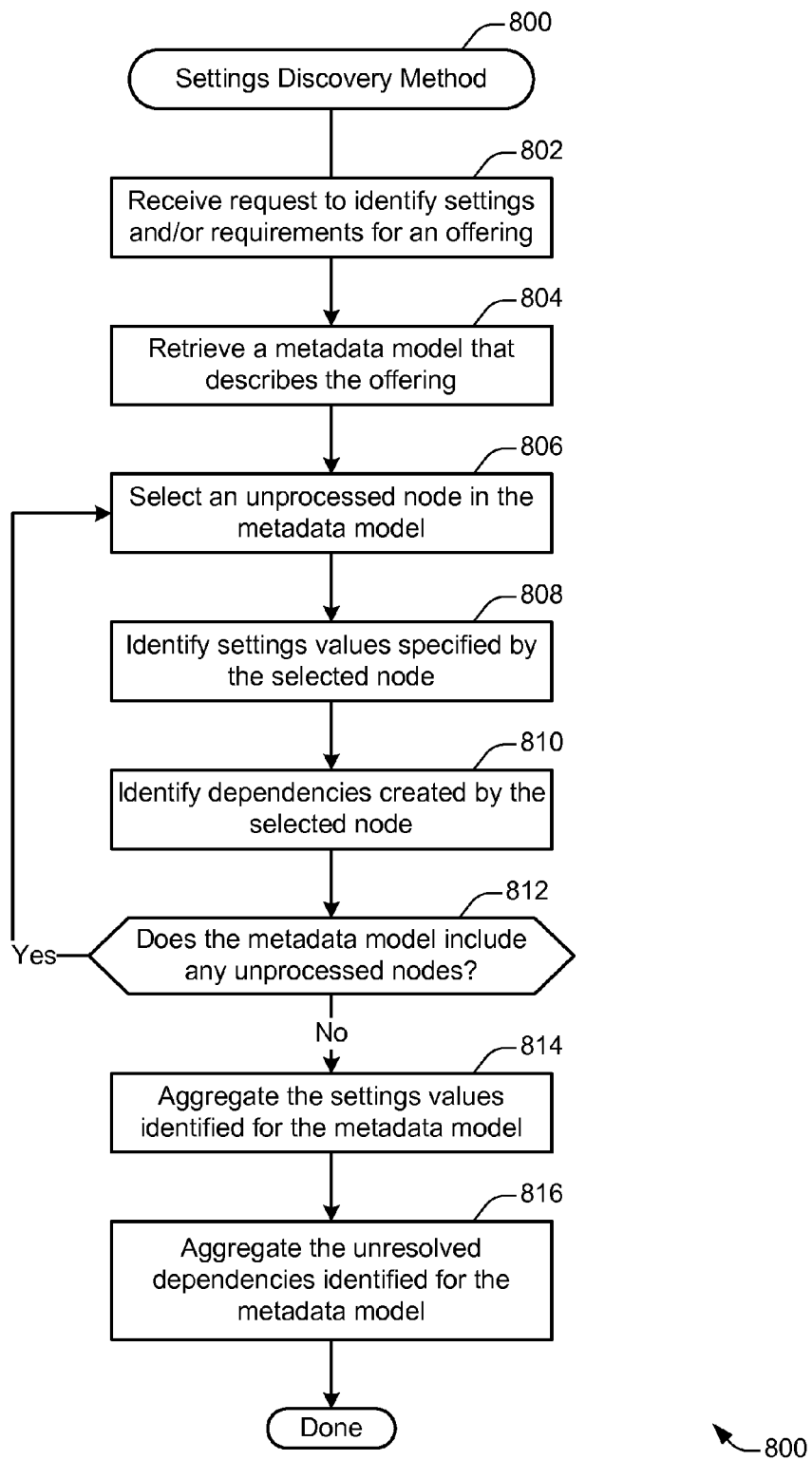
FIG. 8 shows a flow diagram of a method 800 for discovering settings, performed in accordance with one embodiment.

FIG. 8 shows a flow diagram of a method 800 for discovering settings, performed in accordance with one embodiment. In some implementations, units of computing functionality may be organized within a hierarchical settings model and/or selected for inclusion in service offerings.

In some implementations, when a service offering is activated for a particular entity, the setting values associated with the settings included within the service offering need to be assigned to the settings for that entity. In order for these settings to be set to the correct settings values, the setting values specified by the service offering may need to be identified. The method 800 may be used to identify the settings values specified by a particular service offering.

In some implementations, activating a service offering for a particular entity may require that certain requirements are met. As discussed with respect to FIGS. 1-4, settings, components, and features can include requirements that specify variable states associated with other computing resources. The method 800 may be used to identify the requirements associated with a particular service offering.

In some implementations, a single service offering may include or require a variety of constituent units of computing functionality, some of which may overlap with each other. For example, in FIG. 3, the edition 302 includes the licenses 306f and 306g, which both include the setting(s) 308h. Alternately, or additionally, a single service offering may include multiple instances of similar settings values, or may include requirements in one portion of the service offering that are satisfied by a different portion of the service offering. The method 800 may be used to aggregate these overlapping or duplicative requirements and settings values for a particular service offering.

At 802, a request to identify settings and/or requirements for an offering is received. In some implementations, the offering may include an edition, a product, a license, or any other type of service offering accessible via the computing environment.

In some implementations, the request to identify settings and/or requirements may be received from a user. For example, a user creating the offering may initiate the request. Alternately, the request may be received automatically. For example, a request may be generated automatically whenever an offering is created or at a different time, such as when the source items used to generate computing services are built or compiled.

At 804, a metadata model that describes the offering is retrieved. In some implementations, the metadata model may include a description of the various computing resources included within the offering. Also, the metadata model may include a description of the various computing resources that are required in order to activate the offering.

In some implementations, the metadata model may include or may be based on the types of hierarchical charts of computing resources shown in FIGS. 1-3. Another example of a type of chart that may represent a metadata model is discussed with respect to FIG. 9.

At 806, an unprocessed node in the metadata model for the offering is selected. In some implementations, a node in the metadata model may represent a particular unit of computing functionality. For example, a node may correspond to a feature, component, setting, or other unit of computing functionality.

In some implementations, nodes may be selected sequentially. Alternately, nodes may be selected according to a tree traversal algorithm, such as depth first search or breadth first search.

At 808, settings values specified by the selected node are identified. In some implementations, the selected node may specify one or more settings values. For example, including a feature or a component within a service offering may implicitly include a setting value corresponding to a setting that defines whether or not the feature or component is activated. As another example, a selected node corresponding to a setting may explicitly define a setting value for a particular setting. For instance, a particular license may provide 50 custom objects for use by an entity subscribing to the license.

At 810, dependencies created by the selected node are identified. In some implementations, dependencies may include any dependency relationships involving the selected node that require access to other computing resources. For example, if the feature 622 shown in FIG. 6 were part of a service offering but the feature 624 were not part of the service offering, then analysis of a node corresponding to the feature 622 may result in the identification of the dependency relationship between the features 622 and 624 as an unresolved dependency created by the selected node.

At 812, a determination is made as to whether the metadata model includes any unprocessed nodes. As discussed with respect to operation 806, the nodes within the metadata model may be processed recursively, sequentially, or via any other method of traversal.

At 814, the settings values identified for the metadata model are aggregated. In some cases, different setting values associated with the same setting may be summed to achieve the final setting value. In other cases, when different setting values are associated with the same setting, one of the setting values may be selected as the final value for that setting.

In some implementations, the method of aggregating values for a particular setting may be specified by the setting itself. For example, one setting may specify that values for the setting should be summed, while another setting may specify that the largest value assigned to the setting should be selected.

At 816, the unresolved dependencies identified for the metadata model are aggregated. In some implementations, aggregating the unresolved dependencies may include eliminating duplicate dependencies. For example, if two different features included within the service offering require access to a feature external to the service offering, then this requirement need only be listed once.

In some implementations, aggregating the unresolved dependencies may include performing set logic to eliminate the dependencies that are resolved by the settings values identified for the metadata model. For example, the set of dependency values may be effectively subtracted from the set of requirements values to identify the dependency values that are not resolved by the settings values.

The settings values identified at 814 and the unresolved dependencies identified at 816 may be used to provide a description of the service offering. By identifying these values, an entity deciding whether to request the service offering may be able to identify the specific computing functionality provided by the service offering as well as the pre-existing computing functionality needed in order to activate the requested service offering.

Figure 9:
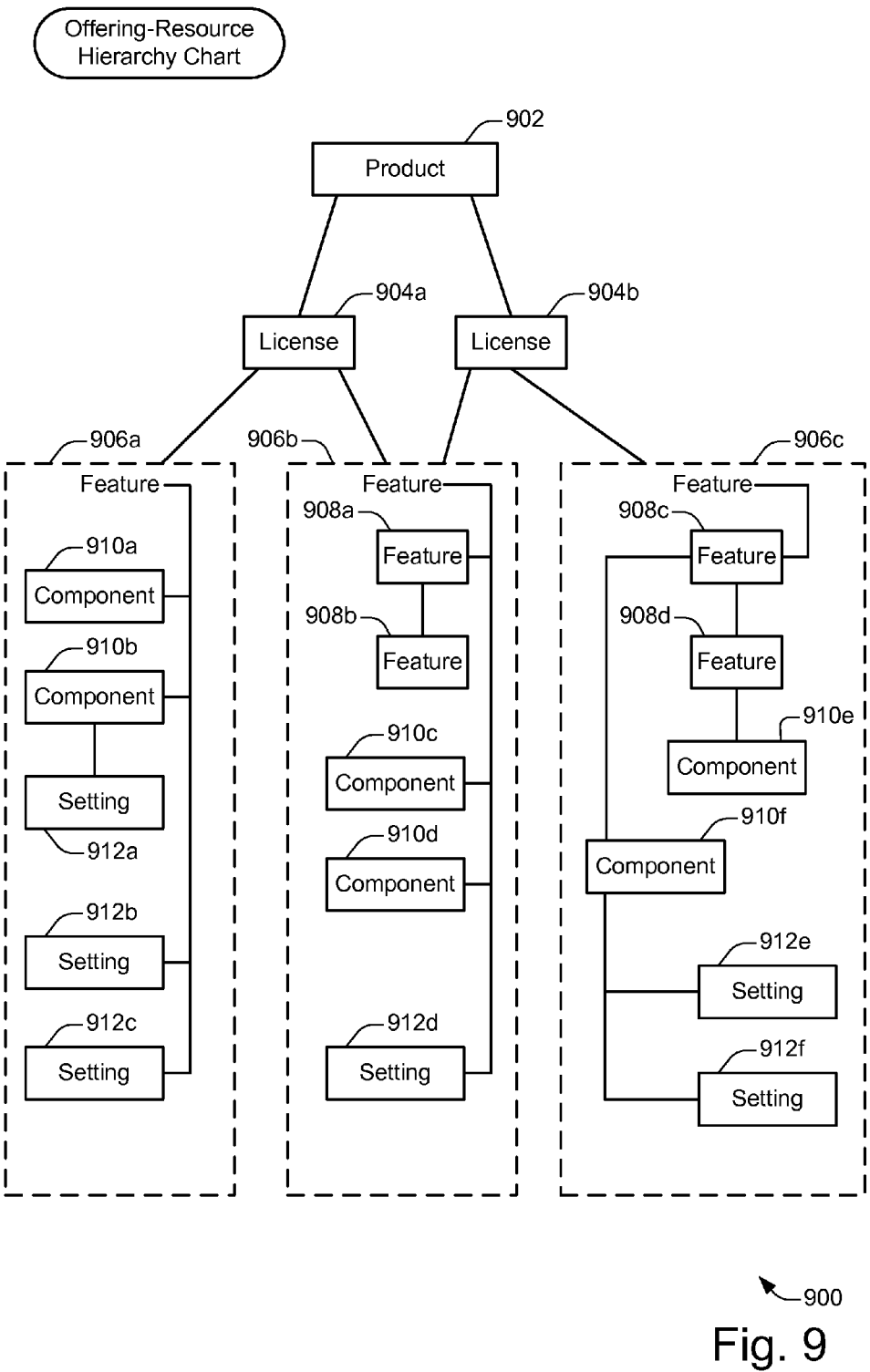
FIG. 9 shows a chart 900 illustrating an offering-resource hierarchy, in accordance with one embodiment.

FIG. 9 shows a chart 900 illustrating an offering-resource hierarchy, in accordance with one embodiment. In some implementations, the chart 900 shown in FIG. 9 is an alternative visualization of the type of information shown in FIGS. 2 and 3. Thus, the product, licenses, features, components, and settings shown in FIG. 9 may be substantially similar to the products, licenses, features, components, and settings described herein in conjunction with other features.

The chart 900 shows a product 902 as well as some of the constituent parts of the product 902. Specifically, the product 902 includes the licenses 904a and 904b. The licenses directly include the features 906a-906c and indirectly include the features 908a-908, the components 910a-910f, and the settings 912a-912f.

In some implementations, the chart 900 shown in FIG. 9 may assist in conceptualizing the settings discovery method 800 shown in FIG. 8. As shown in FIG. 9, a single product, edition, or other service offering may be composed of various licenses, features, components, and settings. In some instances, the licenses may overlap. The service offering may be represented by a metadata model that is structured in a fashion similar to the chart 900 shown in FIG. 9. The method 800 may iterate over this metadata model to determine the settings and the corresponding settings values contained within the service offering.

In some implementations, a product 902 may be any service offering available for use by entities accessing a computing services environment. The product may be composed of a number of licenses, such as the licenses 904a and 904b. The licenses in turn may provide the right to use a number of constituent features, such as the features 906a, 906b, and 906c.

In some implementations, licenses may directly contain features. For example, the license 904 contains the feature 906a, and the license 904b contains the feature 906c. In some instances, licenses may contain overlapping feature sets. For example, both the license 904a and the license 904b contain the feature 906b.

In some implementations, a license may indirectly contain features by virtue of these secondary features being included within other features included in the license. For example, the feature 906b includes the features 908a and 908b. As another example, the feature 906c includes the features 908c and 908d.

In some implementations, features may contain components. Components may be contained directly within in features. For example, the components 910a and 910b are directly contained within the feature 906a, the components 910c and 910d are directly contained within the feature 906b, the component 910e is directly contained within the feature 908d, and the component 910f is directly contained within feature 908c. Components may also be contained within other components.

In some implementations, features and components may each contain settings. For example, the settings 912b and 912c are contained within feature 906a. The setting 912a is contained within the component 910b. The setting 912d is contained within the feature 906b, and the settings 912e and 912f are contained within the component 910f.

Figure 10:
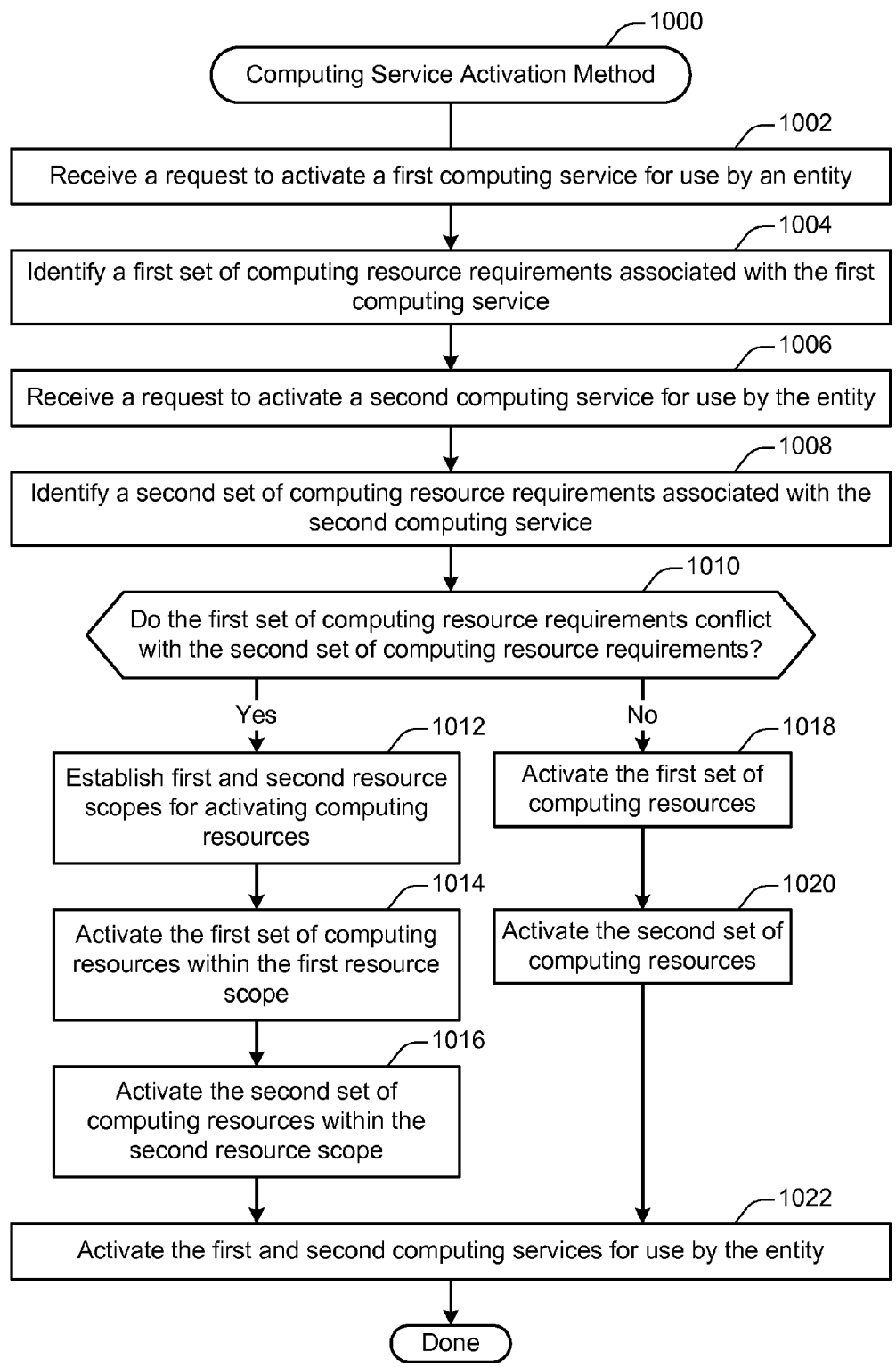
FIG. 10 shows a flow diagram of a method 1000 for activating computing services, performed in accordance with one embodiment.

FIG. 10 shows a flow diagram of a method 1000 for activating computing services, performed in accordance with one embodiment. In some implementations, entities accessing computing services via a computing services provider may be provided with an entity-specific virtual computing environment. In some instances, an entity-specific virtual computing environment may be referred to as an organization or an org. An entity's org may be used to contain data and define settings and services accessible to the entity.

In some implementations, an entity's org may include access to one or more computing services or applications. At least some of the computing services or applications may be selectively enabled or disabled. That is, different entities may have different computing services or applications activated within their respective orgs.

In some implementations, a computing service or application may be provided by the service provider of the computing services environment. An application or computing service provided by the service provider may be referred to herein as a "service provider application." The service provider may provide a variety of applications for use by entities accessing the service provider. For example, the service provider may provide customer relations management (CMS) applications, database management applications, customer service applications, workflow applications, sales applications, or any other type of computing service applications.

In some implementations, a computing service or application may be provided by another entity accessing the computing services environment. An application or computing service provided by another entity may be referred to herein as a "third party application."

For instance, entities accessing the computing services environment may develop third party applications that interact with and utilize the computing resources accessible via the computing services environment. Then, the entities may make these third party applications available for use by other entities accessing the computing services environment.

In some implementations, an application may have an activated and a deactivated state for a particular org. For example, an entity may need to pay the service provider or a third party entity for access to the application. As another example, activating an application may use computing resources associated with an org, such as storage space or custom database objects. Thus, an entity may choose to conserve resources by not activating at least some applications.

In some implementations, each org may be associated with a defined set of computing resources. These computing resources may include, but are not limited to: processing cycles, temporary memory, storage memory, database rows, database columns, custom database objects, standard database objects, features, components, settings, and other real and virtual computing resources.

In some implementations, the computing resources available within a particular org may be defined by variables corresponding to settings. A variable may be assigned a state that defines a setting value. For example, a custom database objects setting may have a variable for a particular org that is assigned a value of 10, indication that 10 custom database objects are available within the org.

In some instances, a variable state may indicate a level of paid access associated with the org. For instance, an entity may pay for a service level that allows the use of 10 custom database objects. Alternately, or additionally, a variable state may indicate a choice made by the entity. For instance, an entity may choose to enable or disable a certain type of functionality within its org for security reasons.

In some implementations, an application or computing service may be associated with a set of computing resource requirements. The computing resource requirements may specify necessary or acceptable variable states for variables that may be accessed when providing the computing service.

In some implementations, the applications or computing services activated for a particular org may share a set of computing resources. For example, if an org has a license to use a particular set of computing resources, then any computing service activated for the org may use the computing resources specified by the license. However, in some instances an entity may request to activate a computing service associated with computing resource requirements that conflict with computing resource requirements associated with another computing service. For example, one computing service may require that a particular type of functionality be enabled for the org, while another computing service may require that the functionality be disabled for the org. As another example, a third party computing service may require computing resources in excess of those provided by the entity's current service level. In these situations, the entity may wish to activate the requested computing service without changing the conflicting computing resources for the other computing service. For instance, the entity may wish to activate a third party service without paying to increase the entity's overall service level. As another example, the entity may wish to enable a particular type of computing functionality within the org for one application while leaving the functionality disabled within the org for another application.

In order to facilitate the activation of computing services with conflicting sets of computing resource requirements, two or more feature scopes may be introduced for an org. Each computing service activated within the org may be associated with a respective feature scope. Each feature scope may define one or more variables that may be accessed when providing computing services within the feature scope. A feature scope may also be referred to herein as a resource scope.

In some implementations, an entity may request to activate a third party application. The third party application may require features that are not activated within the entity's org. In this case, the features may be activated within a feature scope limited to the third party application and any related applications (e.g., extensions). For example, an org may not allow an administrator to create a workflow rule, but the entity may be able to activate an application that has workflow rules embedded or packaged within it. Allowing the activation of services with conflicting sets of resource requirements may thus facilitate the creation and distribution of third party applications.

In some implementations, a platform license may be granted to an organization as a whole or may specify one or more packages or applications to which the platform license is scoped.

In some implementations, a platform license scoped to a particular package may apply to that package as well as to any extension packages related to the package. Alternately, a platform license may not apply to an extension package, for example if a more specific package-scoped license applies to the extension package.

In some implementations, if more than one platform license applies to an executed package, then the effective value for a variable may be determined by aggregating the variable values from each license. Alternately, a variable value may be selected from one of the platform licenses that apply.

Operations that may be performed when activating computing services that have conflicting resource requirements are discussed with respect to FIG. 10. In some instances, one or both of the computing services may be specific service provider services or third party services with specific sets of resource requirements. Alternately, one of the computing services may include a baseline or platform level of functionality provided for the org.

At 1002, a request to activate a first computing service for use by an entity is received. In some implementations, the first computing service may include a service provider service and/or a third party service. The first computing service may include any individual or group of applications or computing functionality capable of being provided within the computing environment.

At 1004, a first set of computing resource requirements associated with the first computing service is identified. In some implementations, the first set of computing resource requirements may be identified via the settings discover procedure 800 shown in FIG. 8. Alternately, the first set of computing resource requirements may be identified in some other way.

At 1006, a request to activate a second computing service for use by the entity is received. The second service may be any computing service capable of being provided by the computing services provider. In some implementations, operation 1006 may be substantially similar to operation 1002.

At 1008, a second set of computing resource requirements associated with the second computing service is identified. In some implementations, operation 1008 may be substantially similar to operation 1004.

At 1010, a determination is made as to whether the first set of computing resource requirements conflicts with the second set of computing resource requirements. In some implementations, the determination may be made by comparing the variable states defined by the first and second computing resource requirements.

At 1012, first and second resource scopes for activating computing resources are established. In some embodiments, the first and second resource scopes may provide virtual computing spaces for defining variable states. At runtime, the value of a particular variable may be determined based on the resource scope associated with the requested operation. For example, if a request for a computing service associated with a first feature scope is received, then value of variables used in providing access to computing resources when providing the first service may be determined with reference to the first features cope.

At runtime, the value of a particular setting is determined based on the package to which the currently executing functionality belongs. If there is a scoped license for that particular package, the value from that license is used.

At 1014, the first set of computing resources is activated within the first resource scope. In some implementations, activating the first set of computing resources within the first resource scope may include establishing a set of variables and corresponding variable states that are capable of being accessed when providing services associated with the first feature scope. For example, a data object corresponding to the first feature scope may be created. The data object may have fields corresponding to the variables referenced by the first set of computing resource requirements. The variable states for these variables may be set so as to satisfy the first set of computing resource requirements.

In some implementations, activating the first set of computing resources within the first resource scope may include operations for assigning the first computing service to the first resource scope. For example, a value may be stored indicating that the first computing service is to be executed with reference to the variable values defined within the first resource scope.

At 1016, the second set of computing resources may be activated within the second resource scope. In some implementations, operation 1016 may be substantially similar to operation 1014.

At 1018, the first set of computing resources is activated. In some implementations, operation 1018 may be substantially similar to operation 1014. However, in operation 1018, the first set of computing resources may be activated for the entity as a whole rather than within a limited features scope.

At 1020, the second set of computing resources is activated. In some implementations, operation 1020 may be substantially similar to operation 1016. However, in operation 1020, the second set of computing resources may be activated for the entity as a whole rather than within a limited feature scope.

At 1022, the first and second computing services are activated for use by the entity. In some implementations, activating the first and second computing services may involve assigning designated states to one or more setting values. The one or more setting values may be associated with settings. These setting values may define whether or not the first and second computing services are activated. The setting values may be specific to the entity.

If the computing resource requirements of the two services do not conflict, then the two services may be accessed in a common feature scope. The common feature scope may apply to all services provided to the entity or may be limited to include a smaller set of the provided services.

If instead the computing resource requirements of the two computing services do conflict, then the two computing services may be accessed via the different resource scopes established at 1012. For instance, when a request to access the first computing service is received, the first computing service may be provided to the entity with reference to variable states assigned to variables within the first feature scope. When a request to access the second computing service is received, the second computing service may be provided to the entity with reference to variable states assigned to variables within the second feature scope.

Figure 11:
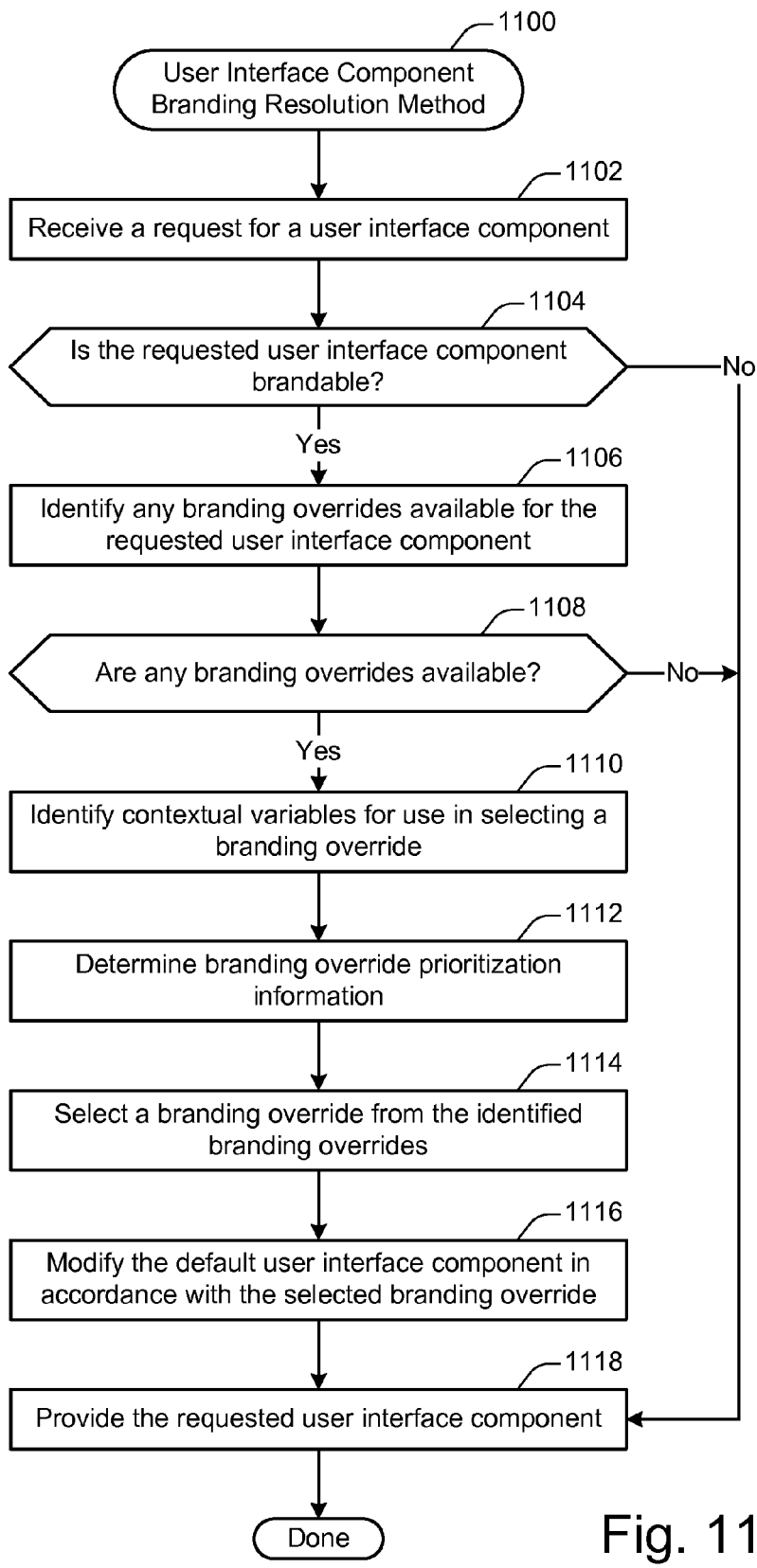
FIG. 11 shows a flow diagram of a method 1100 for resolving user interface component branding, performed in accordance with one embodiment.

FIG. 11 shows a flow diagram of a method 1100 for resolving user interface component branding, performed in accordance with one implementation. In some implementations, a computing environment may provide user interface components for display on a display device. For example, the computing environment may provide user interface components in response to requests for web pages. In some instances, user interface components may be provided to many different entities in many different contexts.

This application uses both the term "component" and "user interface component." As used herein, a "user interface component" refers to computer-generated visual representation capable of being displayed on a display device. A "component" refers more generally to a unit of computing functionality, regardless of whether the unit of computing functionality is capable of being displayed as a distinct visual representation.

In one example, a user interface component for displaying an Account object may be provided to a first user who is associated with a first company, who has a first default language, and who is associated with first settings. The same user interface component may be provided to a second user who is associated with a second company, who has a second default language, and who is associated with second settings. Irrespective of the actual data displayed on the page (in this case, the particular account being viewed), the user's identity, company, default language, and settings define contextual variables that may be used to alter the appearance of the user interface component. For example, a branding override may be selected to reflect a company logo or colors. As another example, a branding override may be selected to reflect a user's preferred language.

In some implementations, information that may be specified by branding may include, but is not limited to: language, text, logos, colors, formatting, system-generated messages such as e-mails, and URIs. For example, a new user may be sent an e-mail that includes a message that varies based on the branding package (e.g., "Welcome to salesforce.com," "Welcome to database.com," or "Welcome to Acme Systems (powered by force.com)"). As another example, instead of accessing a system via one URI (e.g., www.salesforce.com), end users may be provided access to the system via an alternate URI, such as a URI corresponding to a partner.

In some implementations, a customer may install applications (otherwise known as "apps") provided by the service provider of the on-demand service environment. Additionally, or alternately, a customer may install apps from partners of the provider of the on-demand service environment. In a multi-app setting, applications may be branded in order to better ensure that the applications meet the needs and preferences of customers.

In some implementations, brandable user interface components may include messages such as e-mail transmitted via the on-demand service environment. Alternately, or additionally, brandable user interface components may include web pages or portions of web pages provided via a web browser on a client machine in communication with the on-demand service environment.

For example, suppose that a partner provides an application or an org to a customer. The partner may wish to send an e-mail to the customer that reflects the partner's branding. For example, the partner may wish to automatically send a welcome e-mail or a username/password e-mail to the customer.

As another example, suppose that a partner provides an application or an org to a variety of international customers. The partner may wish to ensure that each customer receives services that reflect the customer's preferred language or other international differences.

In some implementations, branding information may be provided by the provider of the on-demand service environment, a partner of the on-demand service environment provider, a customer, and/or a different entity. For example, a customer may be able to override branding elements established by a partner.

In some implementations, the provider of the on-demand service environment may be able to override default settings and/or define a branding owner. The branding owner may have the ultimate authority as to the branding of a user interface component. The branding ownership may be resolved when a customer installs apps from different providers.

In some implementations, branded content/components may be stored as metadata API files. A user interface component may specify the qualified name of the standard user interface component it overrides. Alternately, or additionally, a user interface component may specify information describing when the specific branded user interface component instance should be used.

In some implementations, more than one branding override may be available for a user interface component. For example, different branding overrides for the same user interface component may be created by different entities within the on-demand service environment. As another example, different branding overrides may be created for different languages or locations. Thus, the appropriate branding override for a requested user interface component may need to be resolved by the on-demand service environment.

However, which branding override is appropriate for a user interface component may change based on contextual variables that may be unknown until runtime. For example, a branding override specifying a different (i.e. non-default) language for a user interface component may be selected based on a requesting user's preferred language.

In some implementations, the user interface component branding resolution method may be employed to resolve the qualified name to the appropriate branded user interface component instance. The resolution method may use the runtime context information and the information from the branded user interface component to find the best match for a requested user interface component.

At 1102, a request for a user interface component is received. In some implementations, the user interface component may be requested as part of providing a service to a user in the on-demand service environment. For example, the user may request a web page that includes the user interface component. As another example, the user may request to send or receive an e-mail message. As yet another example, the user interface component may be requested by an application in the on-demand service environment such as a recently-installed application sending a welcome e-mail to a customer.

At 1104, a determination is made as to whether the requested user interface component is brandable. In some implementations, the determination as to whether the requested user interface component is brandable may be made by consulting a definition or description of the requested user interface component.

In some implementations, standard components provided by the provider of the on-demand service environment may be brandable. Alternately, or additionally, custom components developed by a partner or other user may be brandable.

In some implementations, the UDD schema may include XML elements that support the declaration of brandable user interface components. UDD entities that may be brandable include documents, e-mail templates, VisualForce pages, and other user interface components accessible via the on-demand service environment. An UDD entry may include a qualified name and a type. For example, a brandable welcome e-mail may include a name such as "System-.WelcomeEmail" and a type such as "EmailTemplate."

In some implementations, the metadata associated with a package may include a flag or column indicating whether the package as a whole and/or individual user interface components within the package are brandable. Different metadata may be associated with all packages, managed packages, system-managed packages, and/or user managed packages.

In some implementations, a user such as the base package developer may provide an indication as to whether specific user interface component instances in the package should be brandable. The user may then flag these user interface component instances as brandable.

At 1106, any branding overrides available for the requested user interface component are identified. In some implementations, the branding overrides may be identified by locating any branding bundles that have been created for the package in which the brandable component is contained. A branding bundle may refer to a special type of package that extends the package or packages being branded. A user interface component in the branding bundle may identify the base component it overrides.

In some implementations, a branding bundle may be created by a user such as a brand developer. A branding bundle package may be managed. The components of a branding bundle package may be developer-controlled. When developing the branding bundle, the brand developer may be able to see the list of brandable components in the base package.

In some implementations, the directory of overrideable standard user interface components may be exposed to a branding developer in order to facilitate rebranding standard user interface components by partners. In this case, a reference column in a directory or database, such as the all_managed_package_member override reference column, may act as an enumerator or an ID. The reference column may store the base component ID (e.g., for custom components) or the base component qualified name (e.g., for standard components).

In some implementations, the branding bundle need not override all brandable components in the base package. "The branding bundle may contain non-overrides included via the metadata spider (but not top-level non-override components)."

At 1108, a determination is made as to whether any branding overrides are available. If one or more branding overrides were identified at operation 1106, then a branding override may be selected and applied in operations 1106-1116. Otherwise, the user interface component may be provided in its default form.

At 1110, contextual variables for use in selecting a branding override are identified. The current context may include, for example, a language locale, a namespace, a site, a custom domain, merged license information, or any other contextual information.

In some implementations, contextual variables may be identified by determining an identity of the user associated with the user interface component request and locating preferences or settings associated with that user. For example, the user may have specified one or more preferred languages for a user interface component.

In some implementations, contextual variables may be identified by determining an organization associated with the user interface component request and locating preferences or settings associated with that user. For example, an organization may have created a branding package that includes the organization's logo for use with the requested user interface component.

In some implementations, contextual variables may be identified by determining a network domain or website address associated with the user interface component request. For example, an organization may have created a branding package that specifies a certain color scheme for use with a user interface component provided at a specific network domain or website address.

At 1112, a branding override prioritization is determined. In some implementations, various criteria may be used to prioritize the available branding overrides, and various techniques may be used for evaluating conflicting criteria. For example, a branding override may include metadata that identifies attributes that correspond to context variables modified by the branding override. This metadata may be specified by the creator of the branding override.

In some implementations, some context variables may have higher precedence than other context variables. For example, finding a branded component of the appropriate language may be more important than overriding a default color scheme. Accordingly, a branding override that matches a higher-priority context variable may be prioritized over a branding override that matches only a lower-priority context variable.

In some implementations, a user such as the branding developer may specify information about the context in which override user interface components should be used. This information may be component-level, package-level, or both. Thus, some branding overrides may be identified as inapplicable in a certain context. Accordingly, such branding overrides may be assigned a low priority, such as a priority below the default user interface component.

In some implementations, the resolution framework may prioritize a component from a package that is a further extension of the base. This criterion may aid in selecting the most specialized or specific branding override available. For example, a general branding override may apply to a user interface components when provided to a particular network domain, while a more specific branding override may further modify the user interface component to reflect a non-default language that may be associated with a user of the particular network domain. In this case, the more specific branding override may be prioritized.

At 1114, a branding override is selected from the identified branding overrides. In some implementations, the branding override may be selected by identifying the available branding override that has the highest priority as determined in 1112.

In some instances, a non-default branding override may be selected. In this case, the non-default branding override may be used to modify the requested user interface component to reflect the branding information specified by the branding override.

In other instances, a default user interface component may be selected. For example, the default user interface component may be selected if the available non-default branding overrides have a lower priority than the default user interface component. For example, the default user interface component may be in English, while all of the available non-default branding overrides specify alternate languages for the user interface component. In this example, if the user to which the requested user interface component is to be provided has specified English as his or her preferred language, then the default user interface component may be selected as the branding override.

At 1116, the default user interface component is modified in accordance with the selected branding override. In some implementations, modifying the default user interface component may include replacing portions of the default user interface component with branded portions. For example, a default image or default text in the default user interface component may be replaced with a branded image or branded text specified by the selected branding override.

At 1118, the requested user interface component is provided. In some implementations, providing the requested user interface component may involve one or more of sending a message, rendering a web page, transmitting a rendered web page to a client device, or transmitting metadata to a client device for rendering a web page at the client device. Techniques for providing components to users of an on-demand service environment are discussed in greater detail with respect to FIGS. 12A-14.

Figure 12A:
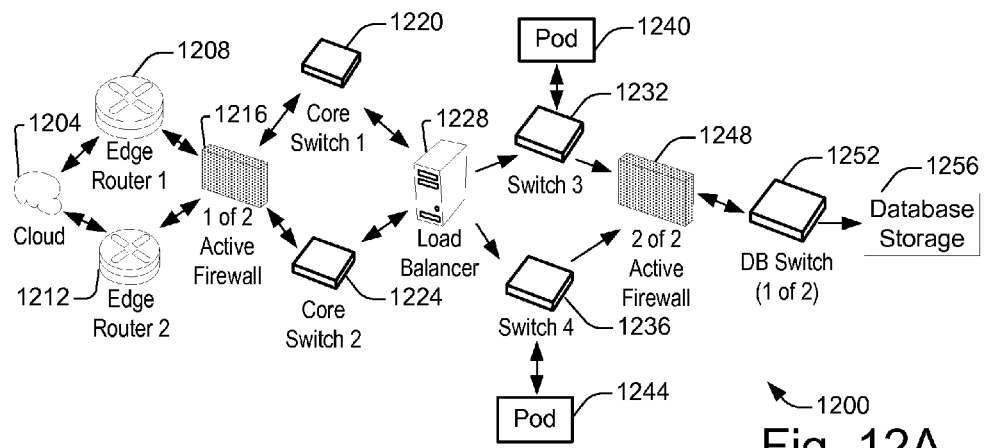
FIG. 12A shows a system diagram 1200 illustrating architectural components of an on-demand service environment, in accordance with one embodiment.

FIG. 12A shows a system diagram 1200 illustrating architectural components of an on-demand service environment, in accordance with one embodiment.

A client machine located in the cloud 1204 (or Internet) may communicate with the on-demand service environment via one or more edge routers 1208 and 1212. The edge routers may communicate with one or more core switches 1220 and 1224 via firewall 1216. The core switches may communicate with a load balancer 1228, which may distribute server load over different pods, such as the pods 1240 and 1244. The pods 1240 and 1244, which may each include one or more servers and/or other computing resources, may perform data processing and other operations used to provide on-demand services. Communication with the pods may be conducted via pod switches 1232 and 1236. Components of the on-demand service environment may communicate with a database storage system 1256 via a database firewall 1248 and a database switch 1252.

Figure 12B:
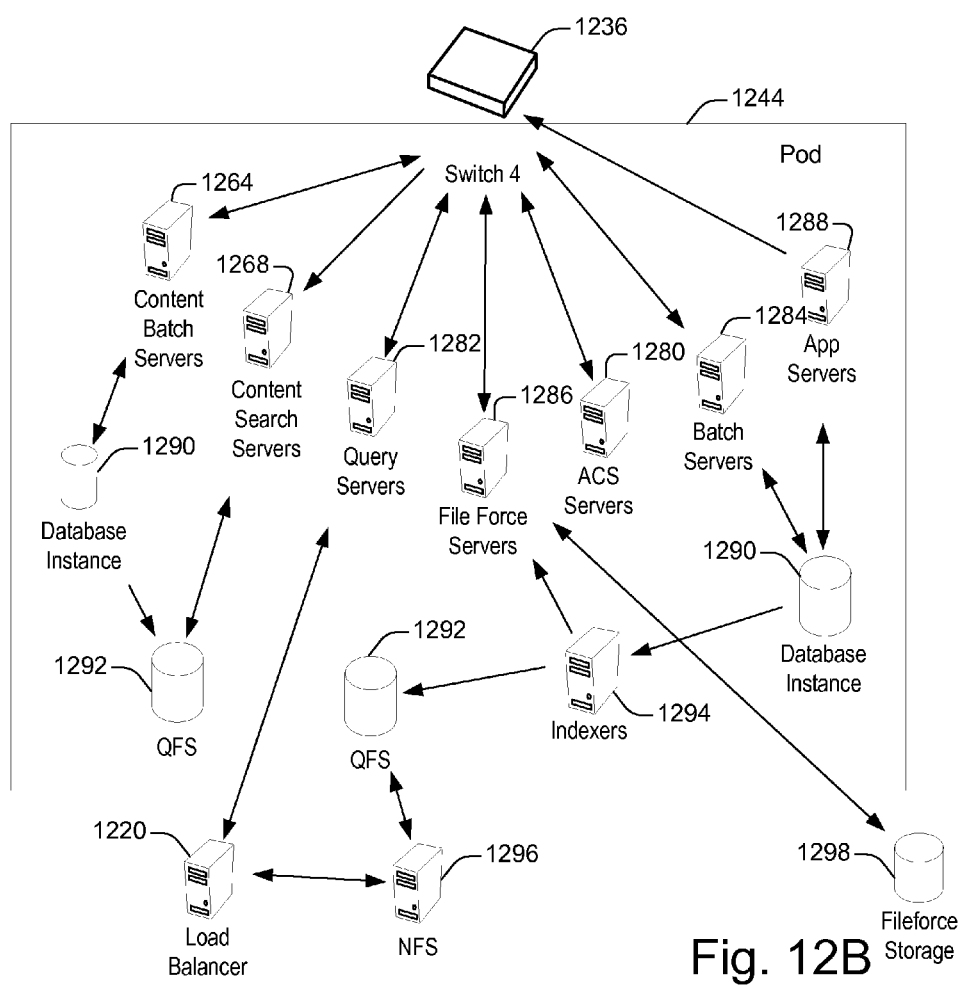
FIG. 12B shows a system diagram further illustrating architectural components of an on-demand service environment, in accordance with one embodiment.

As shown in FIGS. 12A and 12B, accessing an on-demand service environment may involve communications transmitted among a variety of different hardware and/or software components. Further, the on-demand service environment 1200 is a simplified representation of an actual on-demand service environment. For example, while only one or two devices of each type are shown in FIGS. 12A and 12B, some embodiments of an on-demand service environment may include anywhere from one to many devices of each type. Also, the on-demand service environment need not include each device shown in FIGS. 12A and 12B, or may include additional devices not shown in FIGS. 12A and 12B.

Moreover, one or more of the devices in the on-demand service environment 1200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1204 is intended to refer to a data network or plurality of data networks, often including the Internet. Client machines located in the cloud 1204 may communicate with the on-demand service environment to access services provided by the on-demand service environment. For example, client machines may access the on-demand service environment to retrieve, store, edit, and/or process information.

In some embodiments, the edge routers 1208 and 1212 route packets between the cloud 1204 and other components of the on-demand service environment 1200. The edge routers 1208 and 1212 may employ the Border Gateway Protocol (BGP). The BGP is the core routing protocol of the Internet. The edge routers 1208 and 1212 may maintain a table of IP networks or 'prefixes' which designate network reachability among autonomous systems on the Internet.

In one or more embodiments, the firewall 1216 may protect the inner components of the on-demand service environment 1200 from Internet traffic. The firewall 1216 may block, permit, or deny access to the inner components of the on-demand service environment 1200 based upon a set of rules and other criteria. The firewall 1216 may act as one or more of a packet filter, an application gateway, a stateful filter, a proxy server, or any other type of firewall.

In some embodiments, the core switches 1220 and 1224 are high-capacity switches that transfer packets within the on-demand service environment 1200. The core switches 1220 and 1224 may be configured as network bridges that quickly route data between different components within the on-demand service environment. In some embodiments, the use of two or more core switches 1220 and 1224 may provide redundancy and/or reduced latency.

In some embodiments, the pods 1240 and 1244 may perform the core data processing and service functions provided by the on-demand service environment. Each pod may include various types of hardware and/or software computing resources. An example of the pod architecture is discussed in greater detail with reference to FIG. 12B.

In some embodiments, communication between the pods 1240 and 1244 may be conducted via the pod switches 1232 and 1236. The pod switches 1232 and 1236 may facilitate communication between the pods 1240 and 1244 and client machines located in the cloud 1204, for example via core switches 1220 and 1224. Also, the pod switches 1232 and 1236 may facilitate communication between the pods 1240 and 1244 and the database storage 1256.

In some embodiments, the load balancer 1228 may distribute workload between the pods 1240 and 1244. Balancing the on-demand service requests between the pods may assist in improving the use of resources, increasing throughput, reducing response times, and/or reducing overhead. The load balancer 1228 may include multilayer switches to analyze and forward traffic.

In some embodiments, access to the database storage 1256 may be guarded by a database firewall 1248. The database firewall 1248 may act as a computer application firewall operating at the database application layer of a protocol stack. The database firewall 1248 may protect the database storage 1256 from application attacks such as structure query language (SQL) injection, database rootkits, and unauthorized information disclosure.

In some embodiments, the database firewall 1248 may include a host using one or more forms of reverse proxy services to proxy traffic before passing it to a gateway router. The database firewall 1248 may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some embodiments, communication with the database storage system 1256 may be conducted via the database switch 1252. The multi-tenant database system 1256 may include more than one hardware and/or software components for handling database queries. Accordingly, the database switch 1252 may direct database queries transmitted by other components of the on-demand service environment (e.g., the pods 1240 and 1244) to the correct components within the database storage system 1256.

In some embodiments, the database storage system 1256 is an on-demand database system shared by many different organizations. The on-demand database system may employ a multi-tenant approach, a virtualized approach, or any other type of database approach. An on-demand database system is discussed in greater detail with reference to FIGS. 13 and 14.

FIG. 12B shows a system diagram illustrating the architecture of the pod 1244, in accordance with one embodiment. The pod 1244 may be used to render services to a user of the on-demand service environment 1200.

In some embodiments, each pod may include a variety of servers and/or other systems. The pod 1244 includes one or more content batch servers 1264, content search servers 1268, query servers 1272, file force servers 1276, access control system (ACS) servers 1280, batch servers 1284, and app servers 1288. Also, the pod 1244 includes database instances 1290, quick file systems (QFS) 1292, and indexers 1294. In one or more embodiments, some or all communication between the servers in the pod 1244 may be transmitted via the switch 1236.

In some embodiments, the application servers 1288 may include a hardware and/or software framework dedicated to the execution of procedures (e.g., programs, routines, scripts) for supporting the construction of applications provided by the on-demand service environment 1200 via the pod 1244. Some such procedures may include operations for providing the services described herein.

The content batch servers 1264 may requests internal to the pod. These requests may be long-running and/or not tied to a particular customer. For example, the content batch servers 1264 may handle requests related to log mining, cleanup work, and maintenance tasks.

The content search servers 1268 may provide query and indexer functions. For example, the functions provided by the content search servers 1268 may allow users to search through content stored in the on-demand service environment.

The Fileforce servers 1276 may manage requests information stored in the Fileforce storage 1278. The Fileforce storage 1278 may store information such as documents, images, and basic large objects (BLOBs). By managing requests for information using the Fileforce servers 1276, the image footprint on the database may be reduced.

The query servers 1272 may be used to retrieve information from one or more file systems. For example, the query system 1272 may receive requests for information from the app servers 1288 and then transmit information queries to the NFS 1296 located outside the pod.

The pod 1244 may share a database instance 1290 configured as a multi-tenant environment in which different organizations share access to the same database. Additionally, services rendered by the pod 1244 may require various hardware and/or software resources. In some embodiments, the ACS servers 1280 may control access to data, hardware resources, or software resources.

In some embodiments, the batch servers 1284 may process batch jobs, which are used to run tasks at specified times. Thus, the batch servers 1284 may transmit instructions to other servers, such as the app servers 1288, to trigger the batch jobs.

In some embodiments, the QFS 1292 may be an open source file system available from Sun Microsystems® of Santa Clara, Calif. The QFS may serve as a rapid-access file system for storing and accessing information available within the pod 1244. The QFS 1292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1268 and/or indexers 1294 to identify, retrieve, move, and/or update data stored in the network file systems 1296 and/or other storage systems.

In some embodiments, one or more query servers 1272 may communicate with the NFS 1296 to retrieve and/or update information stored outside of the pod 1244. The NFS 1296 may allow servers located in the pod 1244 to access information to access files over a network in a manner similar to how local storage is accessed.

In some embodiments, queries from the query servers 1222 may be transmitted to the NFS 1296 via the load balancer 1220, which may distribute resource requests over various resources available in the on-demand service environment. The NFS 1296 may also communicate with the QFS 1292 to update the information stored on the NFS 1296 and/or to provide information to the QFS 1292 for use by servers located within the pod 1244.

In some embodiments, the pod may include one or more database instances 1290. The database instance 1290 may transmit information to the QFS 1292. When information is transmitted to the QFS, it may be available for use by servers within the pod 1244 without requiring an additional database call.

In some embodiments, database information may be transmitted to the indexer 1294. Indexer 1294 may provide an index of information available in the database 1290 and/or QFS 1292. The index information may be provided to file force servers 1276 and/or the QFS 1292.

Figure 13:
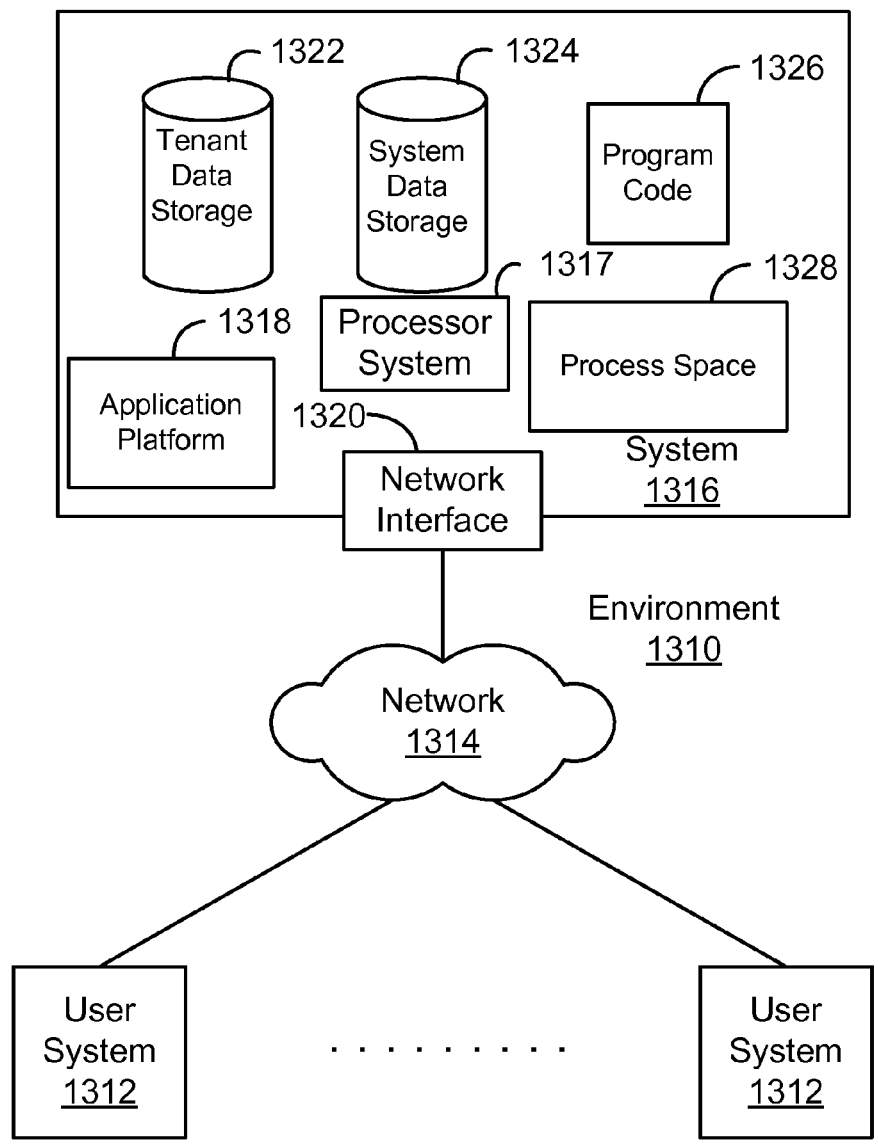
FIG. 13 shows a system diagram 1310 illustrating the architecture of a multitenant database environment, in accordance with one embodiment.

FIG. 13 shows a block diagram of an environment 1310 wherein an on-demand database service might be used, in accordance with one embodiment.

Figure 14:
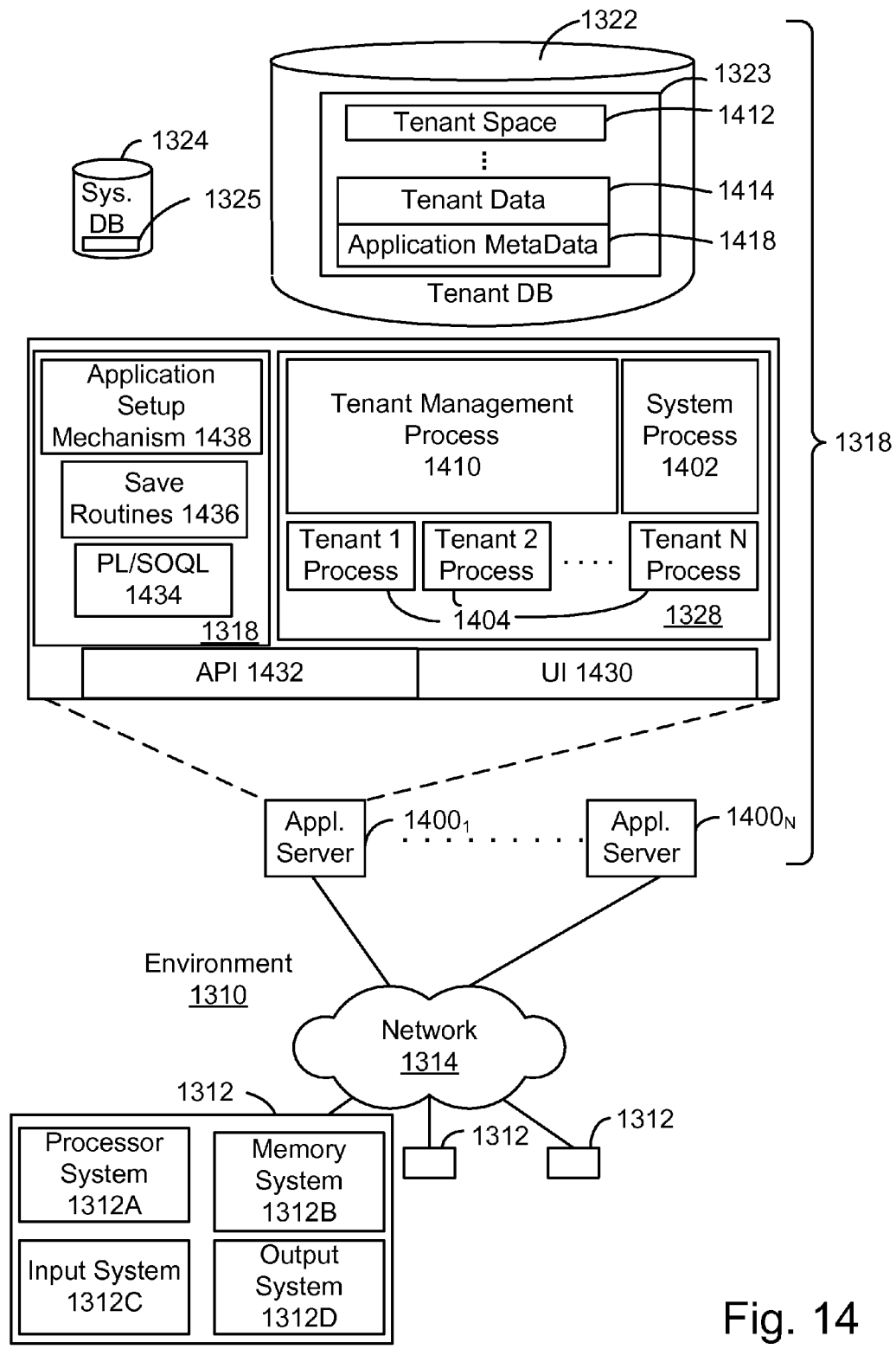
FIG. 14 shows a system diagram 1310 further illustrating the architecture of a multitenant database environment, in accordance with one embodiment.

Environment 1310 includes an on-demand database service 1316. User system 1312 may be any machine or system that is used by a user to access a database user system. For example, any of user systems 1312 can be a handheld computing device, a mobile phone, a laptop computer, a work station, and/or a network of computing devices. As illustrated in FIGS. 13 and 14, user systems 1312 might interact via a network 1314 with the on-demand database service 1316.

An on-demand database service, such as system 1316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 1316" and "system 1316" will be used interchangeably herein. A database image may include one or more database objects. A relational database management system (RDBMS) or the equivalent may execute storage and retrieval of information against the database object(s). Application platform 1318 may be a framework that allows the applications of system 1316 to run, such as the hardware and/or software, e.g., the operating system. In an embodiment, on-demand database service 1316 may include an application platform 1318 that enables creation, managing and executing one or more applications developed by the provider of the on-demand database service, users accessing the on-demand database service via user systems 1312, or third party application developers accessing the on-demand database service via user systems 1312.

One arrangement for elements of system 1316 is shown in FIG. 13, including a network interface 1320, application platform 1318, tenant data storage 1322 for tenant data 1323, system data storage 1324 for system data 1325 accessible to system 1316 and possibly multiple tenants, program code 1326 for implementing various functions of system 1316, and a process space 1328 for executing MTS system processes and tenant-specific processes, such as running applications as part of an application hosting service. Additional processes that may execute on system 1316 include database indexing processes.

The users of user systems 1312 may differ in their respective capacities, and the capacity of a particular user system 1312 might be entirely determined by permissions (permission levels) for the current user. For example, where a call center agent is using a particular user system 1312 to interact with system 1316, the user system 1312 has the capacities allotted to that call center agent. However, while an administrator is using that user system to interact with system 1316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 1314 is any network or combination of networks of devices that communicate with one another. For example, network 1314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 1312 might communicate with system 1316 using TCP/IP and, at a higher network level, use other common Internet protocols to communicate, such as HTTP, FTP, AFS, WAP, etc. In an example where HTTP is used, user system 1312 might include an HTTP client commonly referred to as a "browser" for sending and receiving HTTP messages to and from an HTTP server at system 1316. Such an HTTP server might be implemented as the sole network interface between system 1316 and network 1314, but other techniques might be used as well or instead. In some implementations, the interface between system 1316 and network 1314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1316, shown in FIG. 13, implements a web-based customer relationship management (CRM) system. For example, in one embodiment, system 1316 includes application servers configured to implement and execute CRM software applications as well as provide related data, code, forms, web pages and other information to and from user systems 1312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1316 implements applications other than, or in addition to, a CRM application. For example, system 1316 may provide tenant access to multiple hosted (standard and custom) applications. User (or third party developer) applications, which may or may not include CRM, may be supported by the application platform 1318, which manages creation, storage of the applications into one or more database objects and executing of the applications in a virtual machine in the process space of the system 1316.

Each user system 1312 could include a desktop personal computer, workstation, laptop, PDA, cell phone, or any wireless access protocol (WAP) enabled device or any other computing device capable of interfacing directly or indirectly to the Internet or other network connection. User system 1312 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 1312 to access, process and view information, pages and applications available to it from system 1316 over network 1314.

Each user system 1312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1316 or other systems or servers. For example, the user interface device can be used to access data and applications hosted by system 1316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1312 and all of its components are operator configurable using applications, such as a browser, including computer code run using a central processing unit such as an Intel Pentium® processor or the like. Similarly, system 1316 (and additional instances of an MTS, where more than one is present) and all of their components might be operator configurable using application(s) including computer code to run using a central processing unit such as processor system 1317, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 1316 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 1316 is configured to provide web pages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 14 also shows a block diagram of environment 1310 further illustrating system 1316 and various interconnections, in accordance with one embodiment. FIG. 14 shows that user system 1312 may include processor system 1312A, memory system 1312B, input system 1312C, and output system 1312D. FIG. 14 shows network 1314 and system 1316. FIG. 14 also shows that system 1316 may include tenant data storage 1322, tenant data 1323, system data storage 1324, system data 1325, User Interface (UI) 1430, Application Program Interface (API) 1432, PL/SOQL 1434, save routines 1436, application setup mechanism 1438, applications servers 1400₁-1400N, system process space 1402, tenant process spaces 1404, tenant management process space 1410, tenant storage area 1412, user storage 1414, and application metadata 1416. In other embodiments, environment 1310 may not have the same elements as those listed above and/or may have other elements instead of, or in addition to, those listed above.

User system 1312, network 1314, system 1316, tenant data storage 1322, and system data storage 1324 were discussed above in FIG. 13. Regarding user system 1312, processor system 1312A may be any combination of processors. Memory system 1312B may be any combination of one or more memory devices, short term, and/or long term memory. Input system 1312C may be any combination of input devices, such as keyboards, mice, trackballs, scanners, cameras, and/or interfaces to networks. Output system 1312D may be any combination of output devices, such as monitors, printers, and/or interfaces to networks. As shown by FIG. 14, system 1316 may include a network interface 1320 (of FIG. 13) implemented as a set of HTTP application servers 1400, an application platform 1318, tenant data storage 1322, and system data storage 1324. Also shown is system process space 1402, including individual tenant process spaces 1404 and a tenant management process space 1410. Each application server 1400 may be configured to tenant data storage 1322 and the tenant data 1323 therein, and system data storage 1324 and the system data 1325 therein to serve requests of user systems 1312. The tenant data 1323 might be divided into individual tenant storage areas 1412, which can be either a physical arrangement and/or a logical arrangement of data. Within each tenant storage area 1412, user storage 1414 and application metadata 1416 might be similarly allocated for each user. For example, a copy of a user's most recently used (MRU) items might be stored to user storage 1414. Similarly, a copy of MRU items for an entire organization that is a tenant might be stored to tenant storage area 1412. A UI 1430 provides a user interface and an API 1432 provides an application programmer interface to system 1316 resident processes to users and/or developers at user systems 1312. The tenant data and the system data may be stored in various databases, such as Oracle™ databases.

Application platform 1318 includes an application setup mechanism 1438 that supports application developers' creation and management of applications, which may be saved as metadata into tenant data storage 1322 by save routines 1436 for execution by subscribers as tenant process spaces 1404 managed by tenant management process 1410 for example. Invocations to such applications may be coded using PL/SOQL 34 that provides a programming language style interface extension to API 1432. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1416 for the subscriber making the invocation and executing the metadata as an application in a virtual machine.

Each application server 1400 may be communicably coupled to database systems, e.g., having access to system data 1325 and tenant data 1323, via a different network connection. For example, one application server 14001 might be coupled via the network 1314 (e.g., the Internet), another application server 1400N-1 might be coupled via a direct network link, and another application server 1400N might be coupled by yet a different network connection. Transfer Control Protocol and Internet Protocol (TCP/IP) are typical protocols for communicating between application servers 1400 and the database system. However, other transport protocols may be used to optimize the system depending on the network interconnect used.

In certain embodiments, each application server 1400 is configured to handle requests for any user associated with any organization that is a tenant. Because it is desirable to be able to add and remove application servers from the server pool at any time for any reason, there is preferably no server affinity for a user and/or organization to a specific application server 1400. In one embodiment, therefore, an interface system implementing a load balancing function (e.g., an F5 Big-IP load balancer) is communicably coupled between the application servers 1400 and the user systems 1312 to distribute requests to the application servers 1400. In one embodiment, the load balancer uses a least connections algorithm to route user requests to the application servers 1400. Other examples of load balancing algorithms, such as round robin and observed response time, also can be used. For example, in certain embodiments, three consecutive requests from the same user could hit three different application servers 1400, and three requests from different users could hit the same application server 1400. In this manner, system 1316 is multi-tenant, wherein system 1316 handles storage of, and access to, different objects, data and applications across disparate users and organizations.

As an example of storage, one tenant might be a company that employs a sales force where each call center agent uses system 1316 to manage their sales process. Thus, a user might maintain contact data, leads data, customer follow-up data, performance data, goals and progress data, etc., all applicable to that user's personal sales process (e.g., in tenant data storage 1322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1316 might also maintain system level data usable by multiple tenants or other data. Such system level data might include industry reports, news, postings, and the like that are sharable among tenants.

In certain embodiments, user systems 1312 (which may be client machines/systems) communicate with application servers 1400 to request and update system-level and tenant-level data from system 1316 that may require sending one or more queries to tenant data storage 1322 and/or system data storage 1324. System 1316 (e.g., an application server 1400 in system 1316) automatically generates one or more SQL statements (e.g., SQL queries) that are designed to access the desired information. System data storage 1324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an embodiment in which a service cloud console is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method of identifying computing resources specified by a representation of a computing service, the method comprising:
   causing display of, by a system, a computing environment on a display device, the computing environment being an on-demand computing services environment configured to provide computing services to a plurality of entities in communication with the computing services environment;
   receiving, at the system, a request from the display device to analyze a computing service provided via the computing environment, the computing service having an activated state in which the computing service is available for use and a deactivated state in which the computing service is not available for use;
   responsive to the request from the display device, defining, by the system, a plurality of computing resources within the computing environment, each computing resource associated with a corresponding variable unit of computing functionality within the computing environment;
   associating, by the system, each computing resource with a respective parameter corresponding with a respective parameter value representing a first level of access to the variable unit of computing functionality for the computing resource, the computing service being represented by a metadata model comprising a plurality of nodes representing a hierarchical arrangement of the computing resources, the plurality of entities being associated with a respective set of the parameter values that together specify a level of computing functionality provided to the entity, one or more of the plurality of nodes being associated with a respective one or more requirements, each of the requirements defining a condition that must be satisfied for a computing resource associated with the node to be in the activated state;
   identifying, by the system, one or more dependency relationships between or among the plurality of computing resources represented by the plurality of nodes of the metadata model;
   aggregating, by the system, the parameter values to produce aggregated parameter values by combining at least two of the parameter values that correspond with the same parameter of a same computing resource to determine a second level of access based on the aggregated parameter values, the second level of access providing more access to the variable unit of computing functionality for the same computing resource than the first level of access associated with the at least two parameter values;

determining, by the system, at least one redundancy between or among the aggregated parameter values;

removing, by the system, a computing resource associated with the redundancy from the one or more dependency relationships;

optimizing, by the system, the metadata model to remove one or more of the plurality of nodes associated with the removed computing resource; and updating, by the system, the display of the computing environment on the display device to represent the optimized metadata model.

2. The method recited in claim 1, the method further comprising:

aggregating the requirements to produce aggregated requirements, wherein aggregating the requirements comprises combining at least two of the requirements, and wherein the description of the aggregated parameter values also includes a description of the aggregated requirements.

3. The method recited in claim 1, the method further comprising:

creating the metadata model by grouping the computing resources into units based on the identified dependency relationships.

4. The method recited in claim 1, wherein one or more of the parameters corresponds with a respective parameter value that specifies whether the computing functionality defined by the computing resource associated with the parameter has an activated state in which the computing resource is available for use or a deactivated state in which the computing resource is not available for use.

5. The method recited in claim 1, wherein the metadata model comprises a directed graph, and wherein one of the plurality of nodes is a root node.

6. The method recited in claim 1, wherein aggregating the parameter values comprises traversing the directed graph via a tree traversal algorithm starting with the root node.

7. The method recited in claim 1, wherein data associated with two or more of the entities is stored in a multitenant database accessible to the two or more entities via a network.

8. The method of claim 1, wherein the variable unit of computing functionality represents an amount of a resource of the computing service allocated to the corresponding computer resource.

9. A computing system comprising:

one or more computing processors operable to execute one or more instructions to:

cause display of a computing environment on a display device, the computing environment being an on-demand computing services environment configured to provide computing services to a plurality of entities in communication with the computing services environment;

receive a request from the display device to analyze a computing service provided via the computing environment, the computing service having an activated state in which the computing service is available for use and a deactivated state in which the computing service is not available for use;

responsive to the request from the display device, define a plurality of computing resources within the computing environment, each computing resource associated with a corresponding variable unit of computing functionality within the computing environment;

associate each computing resource with a respective parameter corresponding with a respective parameter value representing a first level of access to the variable unit of computing functionality for the computing resource, the computing service being represented by a metadata model comprising a plurality of nodes representing a hierarchical arrangement of the computing resources, the plurality of entities being associated with a respective set of the parameter values that together specify a level of computing functionality provided to the entity, one or more of the plurality of nodes being associated with a respective one or more requirements, each of the requirements defining a condition that must be satisfied for a computing resource associated with the node to be in the activated state;

identify one or more dependency relationships between or among the plurality of computing resources represented by the plurality of nodes of the metadata model;

aggregate the parameter values to produce aggregated parameter values by combining at least two of the parameter values that correspond with the same parameter of a same computing resource to determine a second level of access based on the aggregated parameter values, the second level of access providing more access to the variable unit of computing functionality for the same computing resource than the first level of access associated with the at least two parameter values;

determine at least one redundancy between or among the aggregated parameter values;

remove a computing resource associated with the redundancy from the one or more dependency relationships;

optimize the metadata model to remove one or more of the plurality of nodes associated with the removed computing resource; and update the display of the computing environment on the display device to represent the optimized metadata model.

10. The computing system recited in claim 9, the one or more computing devices configured to:

aggregate the requirements to produce aggregated requirements, wherein aggregating the requirements comprises combining at least two of the requirements, and wherein the description of the aggregated parameter values also includes a description of the aggregated requirements.

11. The computing system recited in claim 9, the one or more computing devices configured to:

create the metadata model by grouping the computing resources into units based on the identified dependency relationships.

12. The computing system recited in claim 9, wherein one or more of the parameters corresponds with a respective parameter value that specifies whether the computing functionality defined by the computing resource associated with the parameter has an activated state in which the computing resource is available for use or a deactivated state in which the computing resource is not available for use.

13. The computing system recited in claim 9, wherein the metadata model comprises a directed graph, and wherein one of the plurality of nodes is a root node.

14. The computing system recited in claim 9, wherein aggregating the parameter values comprises traversing the directed graph via a tree traversal algorithm starting with the root node.

15. One or more non-transitory computer readable media having instructions stored thereon, the instructions configured to cause a method to be performed for providing a user interface component, the method comprising:
  causing display of a computing environment on a display device, the computing environment being an on-demand computing services environment configured to provide computing services to a plurality of entities in communication with the computing services environment;
  receiving a request from the display device to analyze a computing service provided via the computing environment, the computing service having an activated state in which the computing service is available for use and a deactivated state in which the computing service is not available for use;
  responsive to the request from the display device, defining a plurality of computing resources within the computing environment, each computing resource associated with a corresponding variable unit of computing functionality within the computing environment;
  associating each computing resource with a respective parameter corresponding with a respective parameter value representing a first level of access to the variable unit of computing functionality for the computing resource, the computing service being represented by a metadata model comprising a plurality of nodes representing a hierarchical arrangement of the computing resources, the plurality of entities being associated with a respective set of the parameter values that together specify a level of computing functionality provided to the entity, one or more of the plurality of nodes being associated with a respective one or more requirements, each of the requirements defining a condition that must be satisfied for a computing resource associated with the node to be in the activated state;
  identifying one or more dependency relationships between or among the plurality of computing resources represented by the plurality of nodes of the metadata model;
  aggregating the parameter values to produce aggregated parameter values by combining at least two of the parameter values that correspond with the same parameter of a same computing resource to determine a second level of access based on the aggregated parameter values, the second level of access providing more access to the variable unit of computing functionality for the same computing resource than the first level of access associated with the at least two parameter values;
  determining at least one redundancy between or among the aggregated parameter values;
  removing a computing resource associated with the redundancy from the one or more dependency relationships;
  optimizing the metadata model to remove one or more of the plurality of nodes associated with the removed computing resource; and
  updating the display of the computing environment on the display device to represent the optimized metadata model.

16. The one or more non-transitory computer readable media recited in claim 15, the method further comprising:
  aggregating the requirements to produce aggregated requirements, wherein aggregating the requirements comprises combining at least two of the requirements, and wherein the description of the aggregated parameter values also includes a description of the aggregated requirements.

17. The one or more non-transitory computer readable media recited in claim 15, the method further comprising:
  creating the metadata model by grouping the computing resources into units based on the identified dependency relationships.

18. The one or more non-transitory computer readable media recited in claim 15, wherein one or more of the parameters corresponds with a respective parameter value that specifies whether the computing functionality defined by the computing resource associated with the parameter has an activated state in which the computing resource is available for use or a deactivated state in which the computing resource is not available for use.

* * * * *